US007774275B2

(12) United States Patent
Jung et al.

(10) Patent No.: US 7,774,275 B2
(45) Date of Patent: Aug. 10, 2010

(54) PAYMENT OPTIONS FOR VIRTUAL CREDIT

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 895 days.

(21) Appl. No.: 11/069,905

(22) Filed: Feb. 28, 2005

(65) Prior Publication Data

US 2006/0195394 A1    Aug. 31, 2006

(51) Int. Cl.
*G06Q 40/00* (2006.01)
(52) U.S. Cl. .......................................... 705/39; 705/38
(58) Field of Classification Search .................. 705/39, 705/38
See application file for complete search history.

(56) References Cited

U.S. PATENT DOCUMENTS

| 4,569,526 | A | 2/1986 | Hamilton |
| 5,203,848 | A | 4/1993 | Wang |
| 5,323,315 | A | 6/1994 | Highbloom |
| 5,333,868 | A | 8/1994 | Goldfarb |
| 5,513,129 | A | 4/1996 | Bolas et al. |
| 5,643,088 | A | 7/1997 | Vaughn et al. |
| 5,788,574 | A | 8/1998 | Ornstein et al. |
| 5,795,228 | A | 8/1998 | Trumbull et al. |
| 5,808,612 | A | 9/1998 | Merrick et al. |
| 5,823,879 | A | 10/1998 | Goldberg et al. |
| 5,884,029 | A | * 3/1999 | Brush et al. ................. 709/202 |
| 5,890,995 | A | 4/1999 | Bobick et al. |

(Continued)

FOREIGN PATENT DOCUMENTS

EP    1 326 170 A1    9/2003

OTHER PUBLICATIONS

David Kushner, My Avatar My Self, Apr. 2004, Technology Review, v107n3, pp. 50-55.*

(Continued)

*Primary Examiner*—James A Kramer
*Assistant Examiner*—Seth Weis
(74) *Attorney, Agent, or Firm*—Suiter Swantz pc llo

(57) ABSTRACT

A method and system provides for the use of credit arrangements in simulated environments. A user can participate in credit transactions involving purchases of virtual products, virtual services, and virtual items of value. Feedback is provided to the user regarding results of the credit transactions. In some embodiments multiple users can make simulated purchases or incur simulated credit obligations that are posted to virtual accounts, and the multiple users can also make simulated compensation against balances due or obligations owed for said virtual accounts. The user is also provided with an opportunity of engaging in real-world financial transactions related to the virtual credit arrangement. In some implementations of the system and method, multiple players at different locations can use virtual charge accounts and/or real world financial accounts in connection with arranging or resolving a virtual credit transaction. One aspect makes a virtual charge account service available for use in a fictional world environment, wherein a billing statement charges various fees that may be valuated in fictional world money, real-world money, or non-monetary fictional world value tokens.

21 Claims, 23 Drawing Sheets

U.S. PATENT DOCUMENTS

| | | | |
|---|---|---|---|
| 5,964,660 | A | 10/1999 | James et al. |
| 5,978,780 | A * | 11/1999 | Watson ........................ 705/40 |
| 6,009,458 | A | 12/1999 | Hawkins et al. |
| 6,024,643 | A | 2/2000 | Begis |
| 6,036,601 | A | 3/2000 | Heckel |
| 6,106,395 | A | 8/2000 | Begis |
| 6,119,229 | A | 9/2000 | Martinez et al. |
| 6,135,646 | A | 10/2000 | Kahn et al. |
| 6,152,856 | A | 11/2000 | Studor et al. |
| 6,246,991 | B1 | 6/2001 | Abe et al. |
| 6,251,017 | B1 | 6/2001 | Leason et al. |
| 6,253,193 | B1 | 6/2001 | Ginter et al. |
| 6,267,675 | B1 | 7/2001 | Lee |
| 6,330,547 | B1 | 12/2001 | Martin |
| 6,375,466 | B1 | 4/2002 | Juranovic |
| 6,476,830 | B1 | 11/2002 | Farmer et al. |
| 6,523,829 | B1 | 2/2003 | Walker et al. |
| 6,545,682 | B1 | 4/2003 | Ventrella et al. |
| 6,616,533 | B1 | 9/2003 | Rashkovskiy |
| 6,625,578 | B2 | 9/2003 | Spaur et al. |
| 6,643,751 | B2 | 11/2003 | Rosenquist et al. |
| 6,729,884 | B1 | 5/2004 | Kelton et al. |
| 6,769,691 | B1 | 8/2004 | Kim |
| 6,791,549 | B2 | 9/2004 | Hubrecht et al. |
| 6,793,580 | B2 | 9/2004 | Sinclair et al. |
| 6,850,643 | B1 | 2/2005 | Smith et al. |
| 6,884,166 | B2 | 4/2005 | Leen et al. |
| 6,935,952 | B2 | 8/2005 | Walker et al. |
| 6,954,728 | B1 | 10/2005 | Kusumoto et al. |
| 6,965,868 | B1 | 11/2005 | Bednarek |
| 7,020,632 | B1 | 3/2006 | Kohls et al. |
| 7,054,830 | B1 | 5/2006 | Eggleston et al. |
| 7,115,034 | B2 | 10/2006 | Kuwahara |
| 7,124,088 | B2 | 10/2006 | Bauer et al. |
| 7,147,562 | B2 | 12/2006 | Ohara et al. |
| 7,169,051 | B1 | 1/2007 | Mossbarger |
| 7,169,501 | B2 | 1/2007 | Suganuma et al. |
| 7,249,139 | B2 | 7/2007 | Chuah et al. |
| 7,319,992 | B2 | 1/2008 | Gaos |
| 7,373,377 | B2 | 5/2008 | Altieri |
| 2001/0027430 | A1 | 10/2001 | Sabourian |
| 2001/0037316 | A1 | 11/2001 | Shiloh |
| 2001/0047328 | A1 | 11/2001 | Triola |
| 2001/0056383 | A1 | 12/2001 | Shuster |
| 2001/0056399 | A1 | 12/2001 | Saylors |
| 2002/0013722 | A1 | 1/2002 | Kanaga |
| 2002/0016655 | A1 | 2/2002 | Joao |
| 2002/0022516 | A1 | 2/2002 | Forden |
| 2002/0029252 | A1 * | 3/2002 | Segan et al. ................ 709/217 |
| 2002/0032037 | A1 | 3/2002 | Segawa |
| 2002/0073043 | A1 | 6/2002 | Herman et al. |
| 2002/0087465 | A1 | 7/2002 | Ganesan et al. |
| 2002/0090985 | A1 | 7/2002 | Tochner et al. |
| 2002/0095375 | A1 | 7/2002 | Taneda et al. |
| 2002/0095523 | A1 | 7/2002 | Shimakawa et al. |
| 2002/0113809 | A1 | 8/2002 | Akazawa et al. |
| 2002/0125312 | A1 | 9/2002 | Ogilivie |
| 2002/0128952 | A1 | 9/2002 | Melkomian et al. |
| 2002/0138445 | A1 | 9/2002 | Laage et al. |
| 2002/0152155 | A1 | 10/2002 | Greenwood et al. |
| 2002/0152156 | A1 | 10/2002 | Tyson-Quah |
| 2002/0174055 | A1 | 11/2002 | Dick et al. |
| 2002/0178120 | A1 | 11/2002 | Reid et al. |
| 2002/0188760 | A1 | 12/2002 | Kuwahara |
| 2003/0014423 | A1 | 1/2003 | Chuah et al. |
| 2003/0036987 | A1 | 2/2003 | Omiya |
| 2003/0037101 | A1 | 2/2003 | Torabi |
| 2003/0046689 | A1 | 3/2003 | Gaos |
| 2003/0064807 | A1 | 4/2003 | Walker et al. |
| 2003/0069787 | A1 | 4/2003 | Tendon et al. |
| 2003/0097331 | A1 | 5/2003 | Cohen |
| 2003/0105688 | A1 | 6/2003 | Brown et al. |
| 2003/0107173 | A1 | 6/2003 | Satloff et al. |
| 2003/0115132 | A1 | 6/2003 | Iggland |
| 2003/0144940 | A1 | 7/2003 | Kochansky et al. |
| 2003/0154092 | A1 | 8/2003 | Bouron et al. |
| 2003/0155715 | A1 | 8/2003 | Walker et al. |
| 2003/0187768 | A1 | 10/2003 | Ryan et al. |
| 2004/0058731 | A1 | 3/2004 | Rossides |
| 2004/0073488 | A1 | 4/2004 | Etuk et al. |
| 2004/0133472 | A1 | 7/2004 | Leason et al. |
| 2004/0148221 | A1 | 7/2004 | Chu |
| 2005/0021472 | A1 | 1/2005 | Gettman et al. |
| 2005/0043094 | A1 | 2/2005 | Nguyen et al. |
| 2005/0137015 | A1 * | 6/2005 | Rogers et al. ................ 463/42 |
| 2005/0148388 | A1 | 7/2005 | Vayra et al. |
| 2005/0153766 | A1 | 7/2005 | Harmon |
| 2005/0182693 | A1 | 8/2005 | Alivandi |
| 2005/0216346 | A1 | 9/2005 | Kusumoto et al. |
| 2006/0080613 | A1 | 4/2006 | Savant |
| 2006/0111934 | A1 | 5/2006 | Meggs |
| 2006/0224480 | A1 | 10/2006 | Bent et al. |
| 2006/0234795 | A1 | 10/2006 | Dhunjishaw et al. |
| 2007/0087820 | A1 | 4/2007 | Van Luchene et al. |
| 2007/0117615 | A1 | 5/2007 | Van Luchene |

OTHER PUBLICATIONS

Mike Langberg, Virtual World There Innovative to an Extent, Nov. 27, 2003, San Jose Mercury News, p. 1G.*

Molly Stephens, Sales of in-game assets: an illustration of the continuing failure of intellectual property law to protect digital content creators, May 2002, Texas Law Review, v80n6, pp. 1513-1535.*

"About Deposits and Withdrawals"; Project Entropia; pp. 1; located at http://www.project-entropia.com/Content.ajp?id=1303; printed on Jan. 27, 2005.

"About Project Entropia"; Project Entropia; pp. 1; located at http://www.project-entropia.com/about/Index.ajp; printed on Jan. 27, 2005.

"Bank Account Game"; pp. 1-2; located at http://www.educational-learninggames.com/bank-account-game.asp; Educational Learning Games.com; printed on Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on Feb. 8, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

"IGE Frequently Asked Questions"; IGE; pp. 1-12; located at http://www.ige.com/FrequentlyAskedQuestions.aspx; printed on Jan. 27, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8, 2004.

"Spending Challenge"; The Mint: It Makes Cents; bearing a date of 2002; pp. 1-3; Northwestern Mutual; located at http://wvvw.themint.org/tryit/spendingchallenge.php; printed on Jan. 26, 2005.

Terdiman, Daniel; "Virtual Trade Tough Nut to Crack"; Wired News; bearing a date of Dec. 20, 2004; pp. 1-3; Lycos Inc.; located at http://wired.com/news/print/0,1294,66074,00.html; printed on Jan. 27, 2005.

"The Entertainment of the Future is already here"; Project Entropia; bearing a date of Jan. 27, 2005; pp. 1; located at http://www.project-entropia.com/Index.ajp; printed on Jan. 27, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,895, Jung et al.
U.S. Appl. No. 11/364,498, Jung et al.
U.S. Appl. No. 11/342,368, Jung et al.
U.S. Appl. No. 11/340,832, Jung et al.
U.S. Appl. No. 11/314,967, Jung et al.
U.S. Appl. No. 11/305,878, Jung et al.
U.S. Appl. No. 11/283,551, Jung et al.
U.S. Appl. No. 11/274,759, Jung et al.
U.S. Appl. No. 11/264,824, Jung et al.
U.S. Appl. No. 11/256,695, Jung et al.
U.S. Appl. No. 11/251,624, Jung et al.
U.S. Appl. No. 11/242,647, Jung et al.
U.S. Appl. No. 11/242,619, Jung et al.
U.S. Appl. No. 11/238,684, Jung et al.
U.S. Appl. No. 11/236,875, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/228,043, Jung et al.
U.S. Appl. No. 11/213,442, Jung et al.
U.S. Appl. No. 11/203,686, Jung et al.
U.S. Appl. No. 11/202,964, Jung et al.
U.S. Appl. No. 11/192,342, Jung et al.
U.S. Appl. No. 11/192,320, Jung et al.
U.S. Appl. No. 11/191,252, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,567, Jung et al.
U.S. Appl. No. 11/184,564, Jung et al.
U.S. Appl. No. 11/107,381, Jung et al.
U.S. Appl. No. 11/107,380, Jung et al.
U.S. Appl. No. 11/096,265, Jung et al.
U.S. Appl. No. 11/096,212, Jung et al.
U.S. Appl. No. 11/069,906, Jung et al.
U.S. Appl. No. 11/069,894, Jung et al.
U.S. Appl. No. 11/068,736, Jung et al.
U.S. Appl. No. 11/051,514, Jung et al.
U.S. Appl. No. 12/005,047, Jung et al.
U.S. Appl. No. 12/004,110, Jung et al.
U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,515, Jung et al.
U.S. Appl. No. 11/974,174, Jung et al.
U.S. Appl. No. 11/906,777, Jung et al.
U.S. Appl. No. 11/827,376, Jung et al.
Baig, Edward C.; "Slip into a second skin with an online avatar"; USA Today; bearing a date of Nov. 11, 2003; pp. 1-3; located at http://www.usatoday.com/tech/columnist/edwardbaig/2003-11-11-baig_x.htm; printed on Apr. 1, 2008.

Bartle, Richard A.; "Designing Virtual Worlds: Bibliography"; bearing a date of Jun. 17, 2003; pp. 1-36; located at http://www.mud.co.uk/dvw/bibliography.html; printed on Mar. 24, 2008.
Burgess et al.; "Controlling the Virtual World: Governance of On-Line Communities"; bearing a date of 1999; pp. 1-2; located at http://cse.stanford.edu/classes/cs201-projects-98-99/controlling-the-virtual-world/case/index.html; printed on Mar. 24, 2008; Stanford University.
Castronova, Edward; "Virtual Worlds: A First-Hand Account of Market and Society on the Cyberian Frontier"; bearing a date of Dec. 2001; pp. 1-40; located at http://papers.ssrn.com/abstract=294828; Munich, Germany.
Rhode, Steve; "Avoid credit card balance transfers requiring new purchases"; Gannett News Service; bearing a date of Jul. 18, 2003; pp. 1-3; Myvesta.org Inc.; printed on Apr. 8, 2008.
"Star Wars Galaxies: An Empire Divided"; Adventure Manual; bearing a date of Jun. 26, 2003; total pp. 1-9; LucasFilm Entertainment Company Ltd.
"Star Wars Galaxies: An Empire Divided"; Adventure Manual; bearing a date of Jun. 26, 2003; total pp. 75; LucasFilm Entertainment Company Ltd.
"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.
U.S. Appl. No. 12/221,446, filed Jul. 31, 2008, Jung et al.
U.S. Appl. No. 12/221,459, filed Jul. 31, 2008, Jung et al.
U.S. Appl. No. 12/221,447, filed Jul. 31, 2008, Jung et al.
U.S. Appl. No. 12/221,254, filed Jul. 30, 2008, Jung et al.
U.S. Appl. No. 12/220,675, filed Jul. 24, 2008, Jung et al.
Bloomfield, Robert; "Patenting Virtual Commerce"; pp. 1-5; located at http://terranova.blogs.com/terra_nova/2008/06/last-week-i-rec.html; printed on Jun. 25, 2008.
Patenting Virtual Commerce | Metanomics—Business and Policy in the Metaverse; "Patenting Virtual Commerce"; submitted by Robert Bloomfield; pp. 1-2; located at http://www.metanomics.net/21-jun-2008/patenting-virtual-commerce; printed on Jun. 25, 2008.
U.S. Appl. No. 12/286,532, Jung et al.
U.S. Appl. No. 12/286,530, Jung et al.
U.S. Appl. No. 12/286,127, Jung et al.
U.S. Appl. No. 12/286,096, Jung et al.
U.S. Appl. No. 12/231,298, Jung et al.
U.S. Appl. No. 12/291,349, Jung et al.
U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.
Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.
Krotoski, Aleks; "Online: Virtual trade gets real: Buying virtual goods on the internet is one thing; killing for it is quite another"; The Guardian; bearing a date of Jun. 16, 2005; pp. 1-5; ProQuest; London (UK); printed on Nov. 10, 2009.
White, Mark; "War Of the Worlds"; Independent On Sunday; bearing a date of Jul. 31, 2005; pp. 1-4; Financial Times; © 2005 Independent Digital UK Ltd.

* cited by examiner

PAYMENT OPTIONS FOR VIRTUAL CREDIT

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the herein listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the herein listed application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

For purposes of the USPTO extra-statutory requirements, the present application constitutes a continuation in part of currently co-pending United States patent application entitled VIRTUAL CREDIT IN SIMULATED ENVIRONMENTS, naming Edward K. Y. Jung, Royce A. Levien, Mark A. Malamud, and John D. Rinaldo, Jr., as inventors, filed Feb. 4, 2005, Ser. No. 11/051,514.

The present application is also related to the following commonly owned co-pending United States patent applications filed on the same filing date as the present application. The subject matter of the applications listed below are incorporated by reference in their entirety in the present application to the extent such subject matter is not inconsistent herewith.

Ser. No. 11/069,894 filed on Feb. 28, 2005, entitled "Financial Ventures Based on Virtual Credit", naming Edward K. Y. Jung, Royce A. Levien, Mark A. Malamud, and John D. Rinaldo, Jr. as inventors.

Ser. No. 11/069,906 filed on Feb. 28, 2005, entitled "Hybrid Charge Account for Virtual World Credit", naming Edward K. Y. Jung, Royce A. Levien, Mark A. Malamud, and John D. Rinaldo, Jr. as inventors.

Ser. No. 11/068,736 filed on Feb. 28, 2005, entitled "Compensation Techniques for Virtual Credit Transactions", naming Edward K. Y. Jung, Royce A. Levien, Mark A. Malamud, and John D. Rinaldo, Jr. as inventors.

TECHNICAL FIELD

This application relates generally to financial transactions in virtual world environments.

BACKGROUND

Financial systems in the modern world include many techniques for purchasing things of value. Charge accounts, checking accounts, credit cards, and debit cards are conventional ways for engaging in financial transactions without having to exchange cash or currency as part of the financial transaction.

Virtual world environments often include imaginary characters participating in fictional events, activities and transactions. There are both educational and entertainment benefits in creating new and challenging ways to relate virtual world environments with real-world experiences.

SUMMARY

Various embodiments disclosed herein provide a system and method for creating credit transactions in a fictional world environment wherein a virtual charge account service is made available to a participant in the fictional world environment. Virtual transactions are accepted and charged to a virtual credit account in connection with purchase activities in the fictional world environment, and a billing statement may be provided to the participant who acquires the virtual credit account.

Depending on the circumstances, a billing statement may be authorized to be sent to a real world address of the participant. Also such billing statement may be authorized to be sent to a fictional world address of the participant.

One aspect provides a virtual charge account service available for use in a fictional world environment, wherein a billing statement charges various fees to a participant who acquires the virtual charge account. Such virtual charge account fees may be valuated in fictional world money, real-world money, or non-monetary fictional world value tokens.

Some embodiments are implemented in a computer program product having one or more computer programs for executing a computer process providing a virtual charge account service in a fictional world environment, wherein an authorized fictional world transaction involving a virtual credit account is processed. A billing statement is transmitted for fees owed with respect to the authorized fictional world transaction.

Additional features may be incorporated in a system for processing virtual credit transactions that provides a fictional world environment wherein a virtual transaction may involve a purchase activity. The fictional world environment may include a virtual credit account accessible for use with the purchase activity. The system includes a database record for recording the purchase activity, and an output device coupled to the database record for communicating obligations arising from the purchase activity to a person or entity responsible for virtual credit account obligations.

Some system embodiments include an output device that provides a billing statement transmitted in the fictional world environment to the person or entity responsible for payment obligations of the virtual credit account. In some instances the output device may provide a billing statement transmitted for receipt in the real-world by the person or entity responsible for payment obligations of the virtual credit account.

The virtual credit transactions which are disclosed herein for purposes of illustration may be entered into by many different types of persons and/or entities, depending on advantages arising from embodiments and implementations that may be desired by the parties, the credit entities, the players, the virtual world owner, third party businesses, and others having an interest or involvement in the virtual credit arrangements.

Additional features, aspects and benefits will be understood by those skilled in the art from the following drawings and detailed description for various exemplary and preferred embodiments.

DETAILED DESCRIPTION

Figure 1:
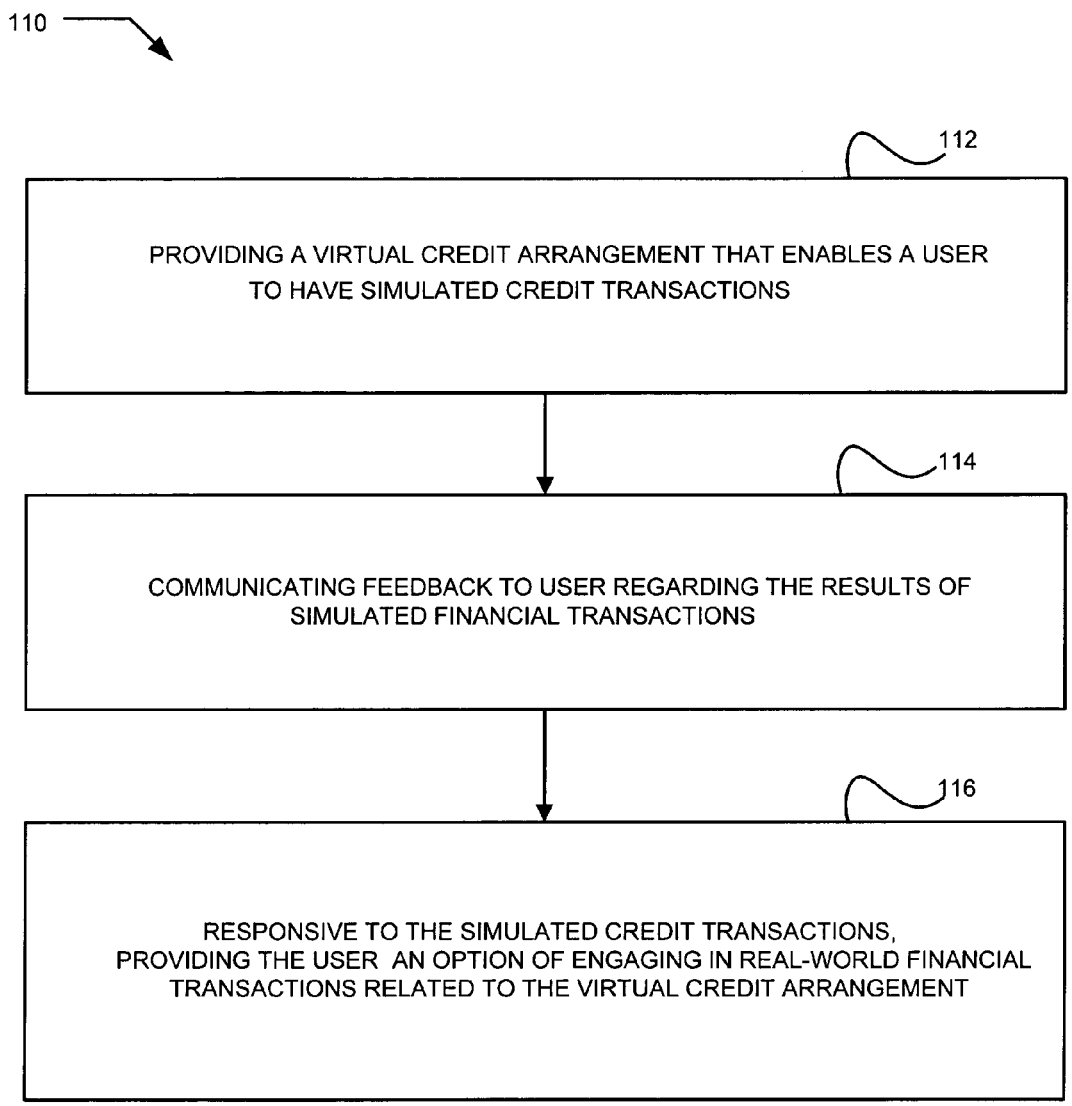
FIG. 1 is a high level flow chart showing an exemplary process for some embodiments.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described in more detail herein, this disclosure describes a method and system for a virtual credit arrangement that enables a user to have simulated credit transactions. Feedback is communicated to the user regarding results of the simulated credit transactions. Responsive to the simulated credit transactions, the user is provided an option of engaging in real-world financial transactions related to the virtual credit arrangement.

In one aspect of the method and system disclosed herein, a virtual account is provided to a user. The user is enabled to make simulated purchases of foods and/or services and/or items of value. The user receives feedback regarding results of the simulated purchases. Responsive to an experience of making the simulated purchases and receiving the feedback, a transition by the user to usage of an actual financial account is facilitated. A further aspect relates to selection of credit terms for simulated purchases of virtual goods and/or services and/or items of value. In some embodiments, certain virtual account terms are programmed—e.g. automatically by a machine under program control—based on user demographic information or other past performance records. In other embodiments certain virtual account terms are varied by the user.

In some embodiments, users are enabled to make simulated purchases or incur simulated credit obligations that are posted to virtual accounts, and users are enabled to make simulated compensation against balances due or obligations owed for virtual accounts. In some instances, users are enabled to make remuneration with something of real value. In other instances, users are enabled to make remuneration with something of virtual value.

The completion of performance benchmarks may be required in some embodiments before allowing transfer to a higher participation level of a virtual credit account. Completion of performance benchmarks may be required before facilitating transition of a user to an actual financial account. In some instances, a user may have an unrestricted option to make transition to an actual financial account.

In some implementations, the system and method provides a simulated environment that enables purchases of various virtual products and/or virtual services and/or virtual items to be made by a plurality of users at different locations. Such purchases may involve credit transactions based on role playing world activities.

Referring to a process 110 shown in the exemplary flow chart of FIG. 1, a virtual credit arrangement is provided in order to enable a user to have simulated credit transactions (block 112). Feedback is communicated to the user regarding results of the simulated financial transactions (block 114). Responsive to the simulated credit transactions, the user is provided with an option of engaging in real-world financial transactions (block 116) related to the virtual credit arrangement. As discussed in more detail herein, such virtual credit arrangements can involve various types of credit arrangements made by the user, under standard or customized credit terms that may involve different forms of compensation such as real-world money, fictional money, action commitments, bartered items, etc.

Figure 2:
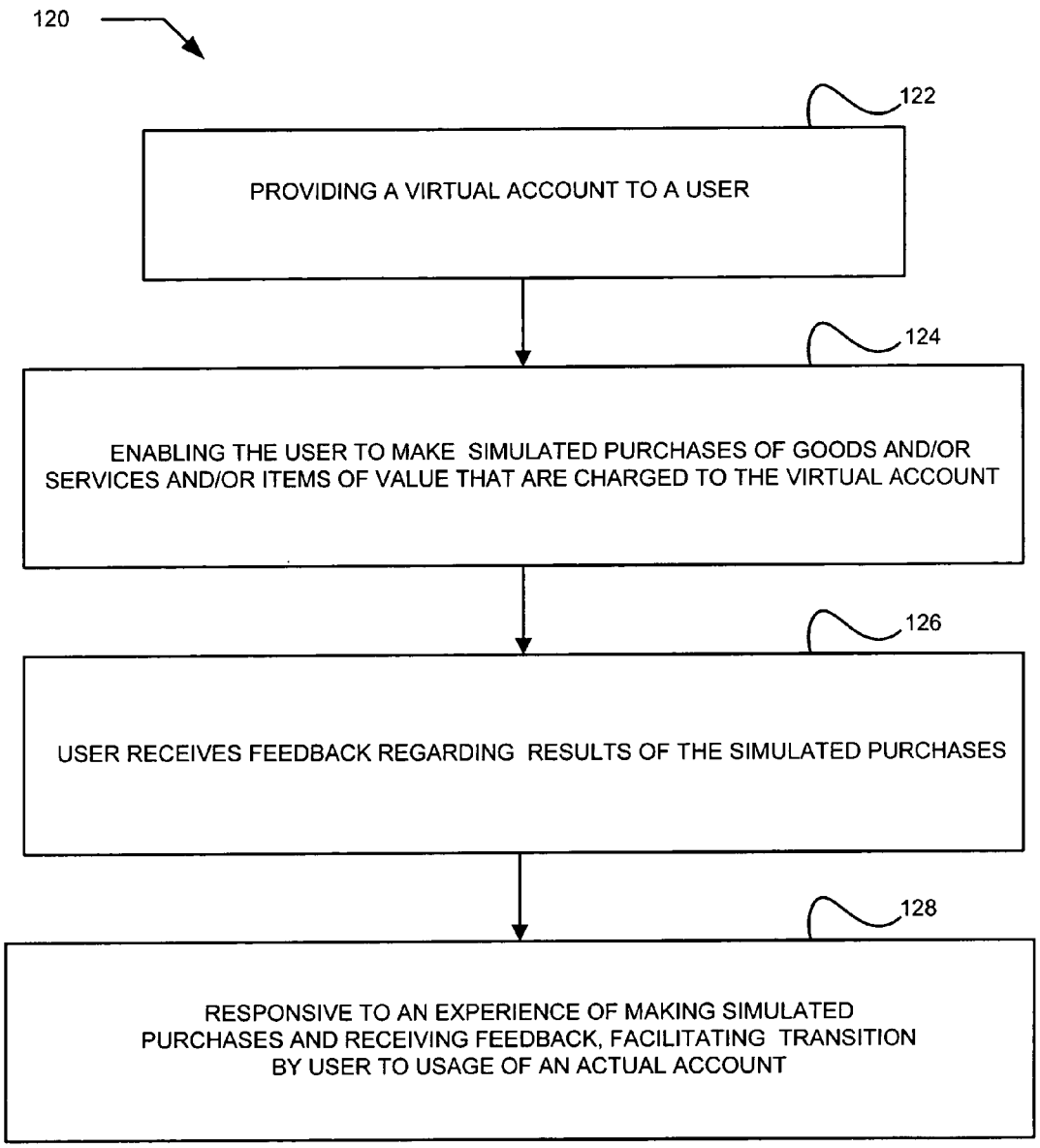
FIG. 2 is another high level flow chart showing a different exemplary process for other embodiments.

Another process 120 shown in the exemplary flow chart of FIG. 2 provides a virtual account to a user (block 122). The user is enabled to make simulated purchases of goods and/or services and/or items of value that are charged to the virtual account (block 124). The user receives feedback (block 126) regarding results of the simulated purchases. Responsive to the user's experience of making simulated purchases and receiving feedback, a transition of the user to usage of an actual account is facilitated (block 128).

The processes of FIGS. 1 and 2 can be implemented with various types of technology, including but not limited to hardware, firmware and/or software systems based on computerized data communications and processing as discussed in more detail herein.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

Figure 3:
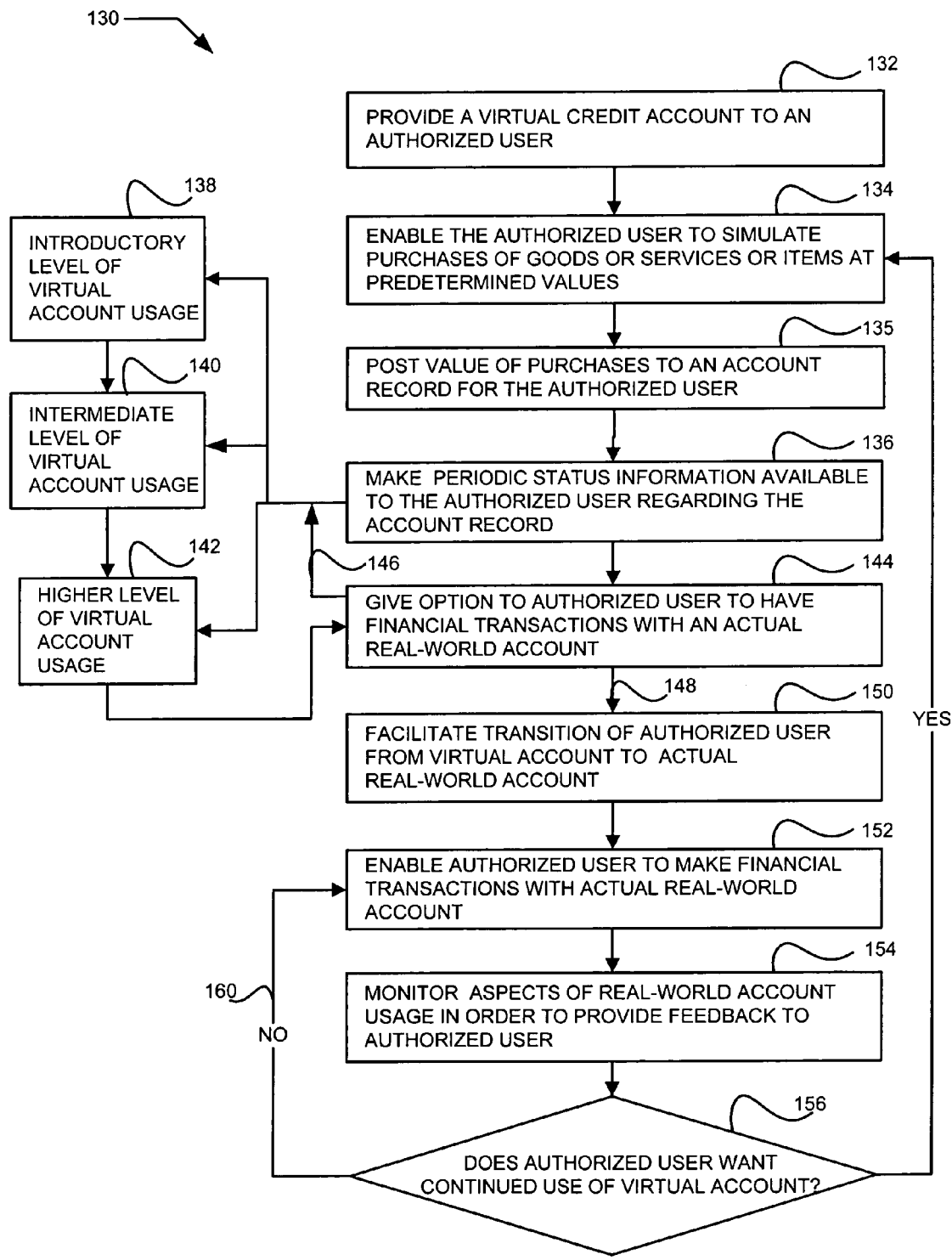
FIG. 3 is a more detailed flow chart showing a further exemplary process for additional embodiments.

A more detailed exemplary flow chart of FIG. 3 shows a process 130 involving alternative usage of both a virtual credit account and a real-world account. As an initial step for new users, a virtual credit account is provided to an authorized user (block 132). The authorized user is enabled to simulated purchases of goods or services or items at predetermined values (block 134). The value of the purchases is posted to an account record (block 135). Periodic feedback including status information is made available to the authorized user regarding the virtual credit account record (block 136).

Various levels of participation are provided for usage of the virtual credit account. Of course any number of levels with different types of credit opportunities for virtual account usage could be incorporated into embodiments, perhaps depending upon the desired financial, educational, and entertainment goals of a system designer as well as possibly depending upon the skill, experience and sophistication of the authorized user. By way of example only, the illustrated process 130 of FIG. 3 includes an introductory level (block 138), an intermediate level (block 140) and a higher level (block 142). After participating in one or more levels of virtual account usage, an authorized user is given an option to have financial transactions with an actual real-world account (block 144). The authorized user may choose to continue (see arrow 146) using the virtual credit account, or take the option (see arrow 148) for transition to the actual real-world account. In some embodiments, the user may have an unrestricted option to make the transition to the actual real-world account. Some embodiments may allow the user to have the option of using either the virtual credit account or an actual financial account during given time periods.

If the option for transition to the actual real-world account is exercised, the transition of the authorized user is facilitated from the virtual credit account to the actual real-world account (block 150). The authorized user can then be enabled to make financial transactions with the actual real-world account (block 152). Aspects of usage of the real-world account may be monitored (block 154) in order to provide feedback to the authorized user. It is to be emphasized that usage of the real-world account does not preclude continued use of the virtual credit account. If the authorized user wants to continue use of the virtual credit account (block 156), then such continued use is made available (see arrow 158). Continued use of the real-world account is also made available (see arrow 160).

Figure 4:
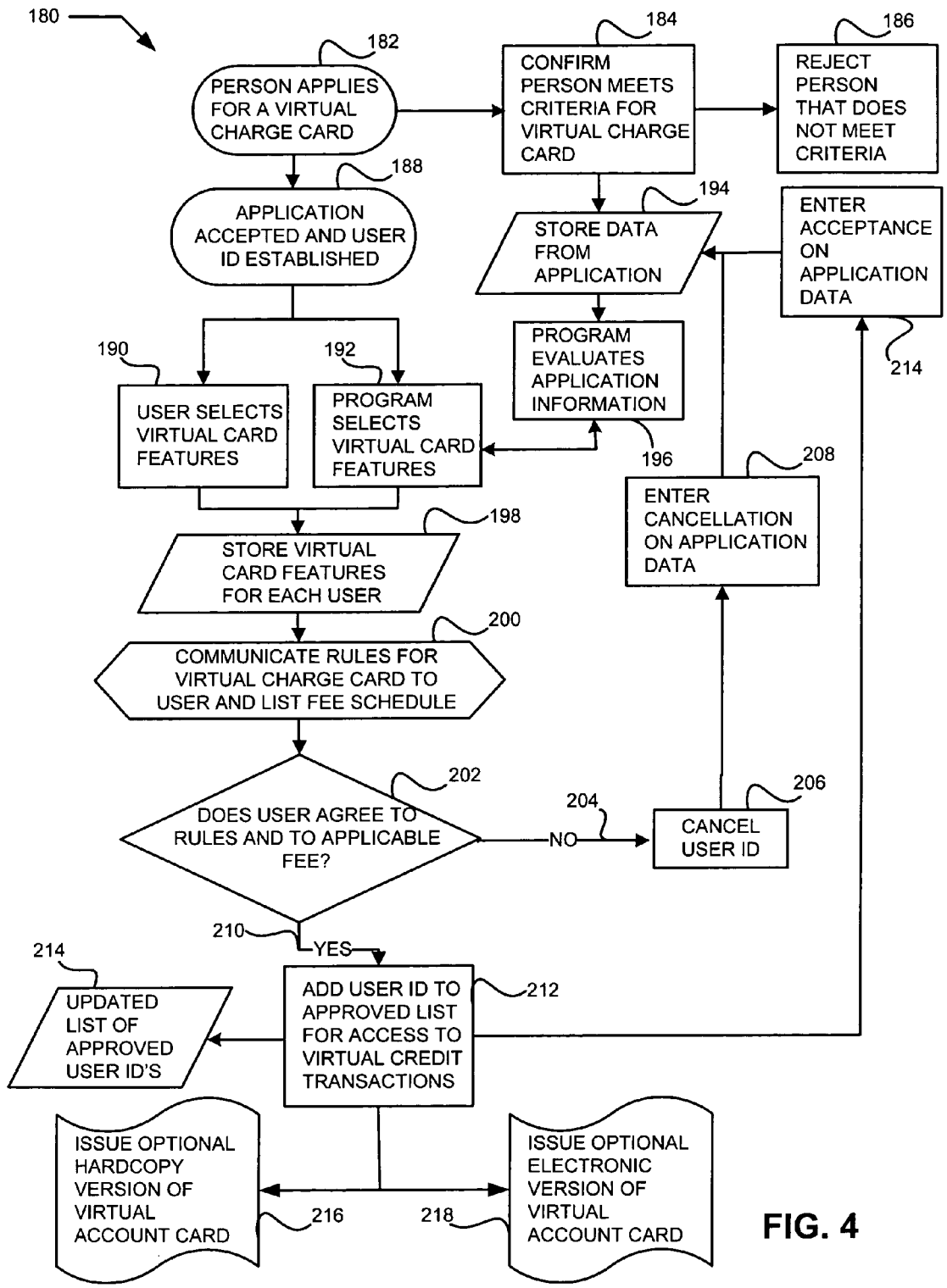
FIG. 4 is another more detailed flow chart showing an exemplary application process for a virtual charge card.

The detailed exemplary flow chart of FIG. 4 shows a process 180 for implementing an application procedure for a virtual charge card. A person who is not already an authorized user can make application (block 182) for a virtual charge card. An evaluation or screening confirms whether or not the person meets predetermined criteria (block 184) for having the virtual charge card. Persons that do not meet the criteria are rejected (block 186). When a person does meet the criteria, their application is accepted and a user ID established (block 188).

In some instances the virtual card features such as credit terms, payment terms, penalties, benefits, and the like may be selected by the user (block 190). In other instances a program may select the virtual card features (block 192), which features may be determined from stored application data (block 194) that is evaluated by the program (block 196). The virtual card features that are selected for each user are stored (block 198) for future reference. Where virtual account terms for a virtual card are being programmed for a new user, such programming may be based on user demographic information.

As part of the application procedure, a fee schedule and virtual card rules are presented to the user (block 200) for consideration. In order to continue the application process, the user decides whether to agree to the rules and applicable fees (block 202). If no agreement occurs (see arrow 204), the use ID is canceled (block 206), and the cancellation is entered (block 208) for storage with the other application data. If agreement is confirmed (see arrow 210), the user ID is added to the approved list (blocks 212, 214) that controls the access to virtual credit transactions involving the virtual credit cards, and the acceptance is also entered (block 214) for storage with the other application data.

A further feature offered to an approved user is the optional issuance of a hardcopy version of the virtual account card (block 216), and also the optional issuance of an electronic version of the virtual account card (block 218).

Figure 5:
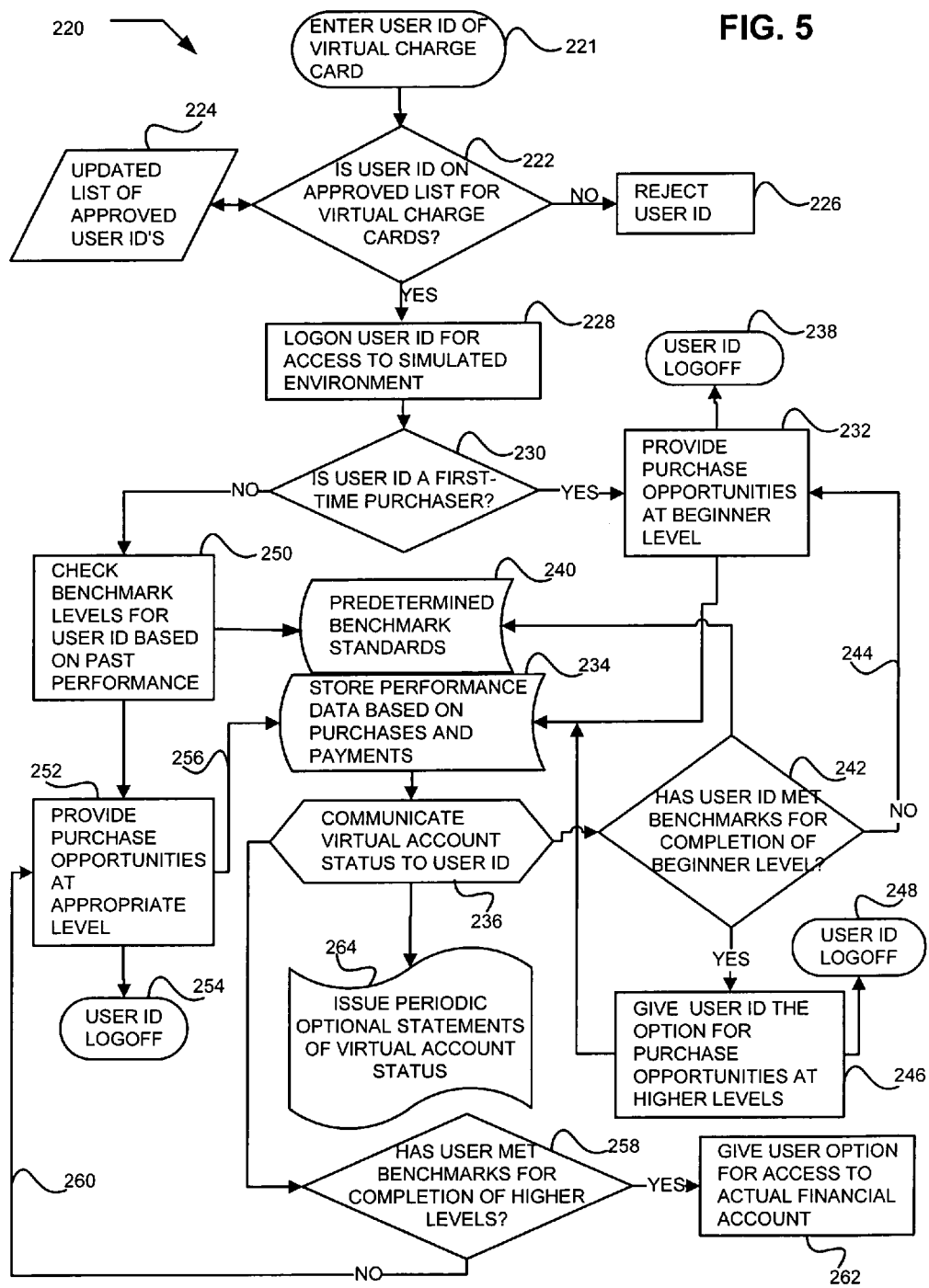
FIG. 5 is a detailed flow chart showing an exemplary manner of using a virtual charge card.

The detailed exemplary flow chart of FIG. 5 shows a process 220 for incorporating benchmark completion as a basis for giving an authorized user the option of having access to an actual financial account. A person is requested to enter the user ID (block 221) of a virtual charge card. The user ID is processed (block 222) to determine whether it is on an updated approved list (block 224). If not found on the updated approved list, the user ID is rejected (block 226). If found on the update approved list, the user ID is approved for logon to have access to a simulated environment (block 228).

A determination may be made to detect a user ID that is a first-time purchaser (block 230). If so, purchase opportunities are made available to the user ID at a beginner level (block 232). Any purchases and/or payments involving the virtual charge card are stored (block 234) as part of a performance data base for future reference. In some instances, revised virtual account terms for the virtual charge card may be programmed based on past performance records maintained in the performance data base. The virtual account status is periodically communicated to the user (block 236). There is no urgency imposed on the user to advance to another participation level, and user logoff (block 238) is available from the beginner level.

A user at the beginner level in this embodiment qualifies for advancement to another participation level when it has been determined that such user has met predetermined benchmark standards (block 240) for completion of the beginner level (block 242). Upon failure to meet such a beginner level benchmark standard, the user can return (see arrow 244) to purchase opportunities at the beginner level. In the event the beginner level benchmarks standards have been met, the user ID is given the option for purchase opportunities at higher levels (block 246). User logoff (block 248) is also available to exit from such higher levels.

When an approved user ID is not a first-time purchaser, a query is made (block 250) to check the stored past performance data (block 234) as compared to the stored benchmark standards (block 240) for this particular user ID. Based on the results of the query, purchase opportunities are provided at the appropriate participation level (block 252), along with a previously described user ID logoff (block 254). Any purchases and/or payments involving virtual credit transactions at these higher participation levels are also stored (see arrow 256) in the performance data base (block 234). The virtual account status is also periodically communicated (block 236) to the users at these higher participation levels.

When a review (block 258) determines that benchmark standards for completion at higher levels have not been met, the user can return (see arrow 260) for further purchase opportunities at such higher levels. Upon satisfactory completion of the higher level benchmark standards, the user has an option for access to an actual financial account (block 262). It is noted that this process embodiment provides for the issuance of periodic optional statements (block 264) indicating the status of the virtual charge card accounts.

Figure 6:
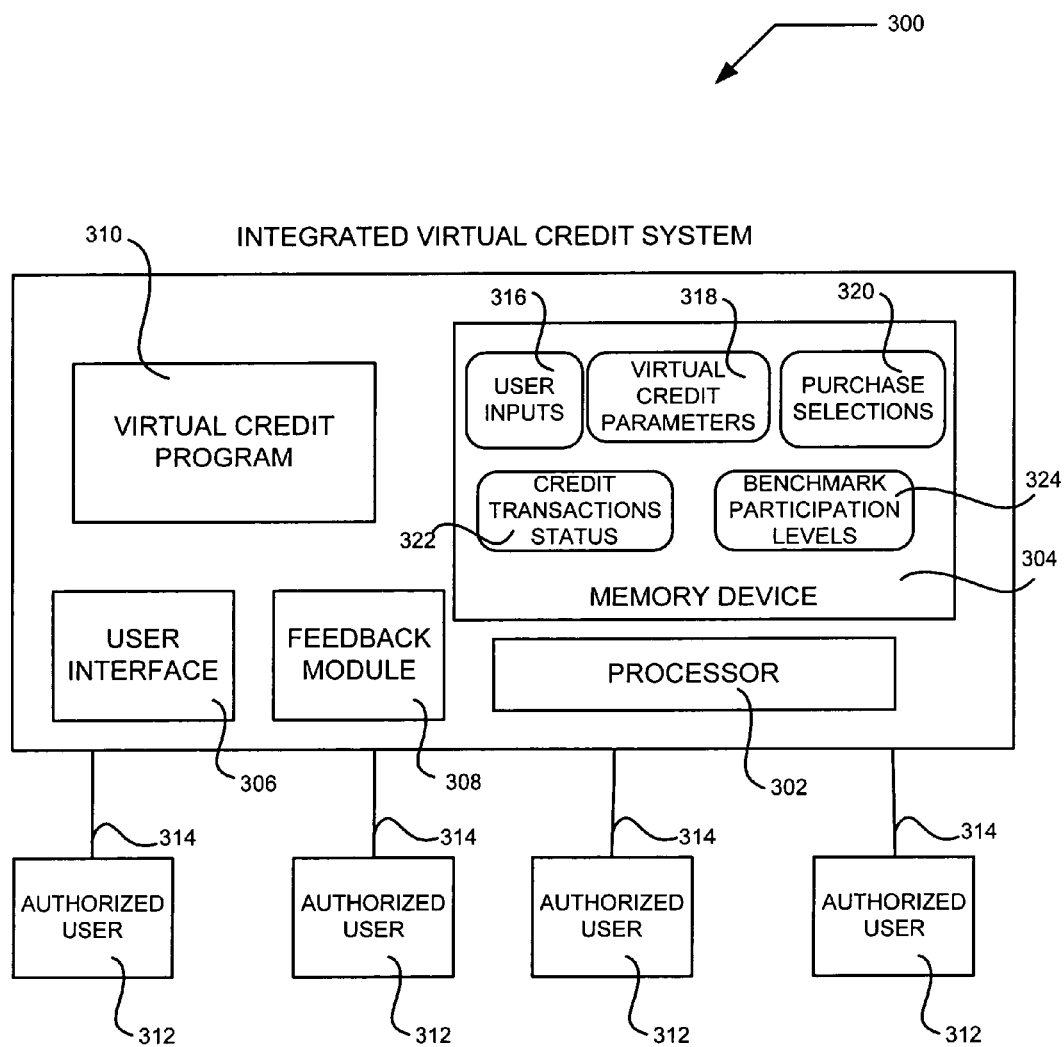
FIG. 6 is a schematic block diagram for an exemplary implementation of some embodiments.

Referring to the schematic block diagram of FIG. 6, an exemplary embodiment of an integrated virtual credit system 300 includes a processor 302, memory device 304, user interface 306, feedback module 308, and virtual credit program 310. A plurality of authorized users 312 who may be at different locations have bi-directional communication links 314 with the virtual credit system 300 in order to submit inputs via the user interface 306 and to receive informational messages from the feedback module 308. The virtual credit program 310 may include one or more computer program products with a carrier medium having program instructions thereon. Such computer program products may run on multiple computer devices or run on an integrated computer system, depending on the circumstances.

The memory device 304 provides re-writable storage capability associated with each authorized user 312. The various categories of data stored in the memory device 304 include user inputs 316, virtual credit parameters 318, purchase selections 320, credit transactions status 322, and benchmark participation levels 324. This system enables multiple users to make simulated purchases or incur simulated credit obligations that are associated with and posted to different virtual accounts. The multiple users are also enabled to make simulated compensation against balances due or obligations owed for the different virtual accounts.

Figure 7:
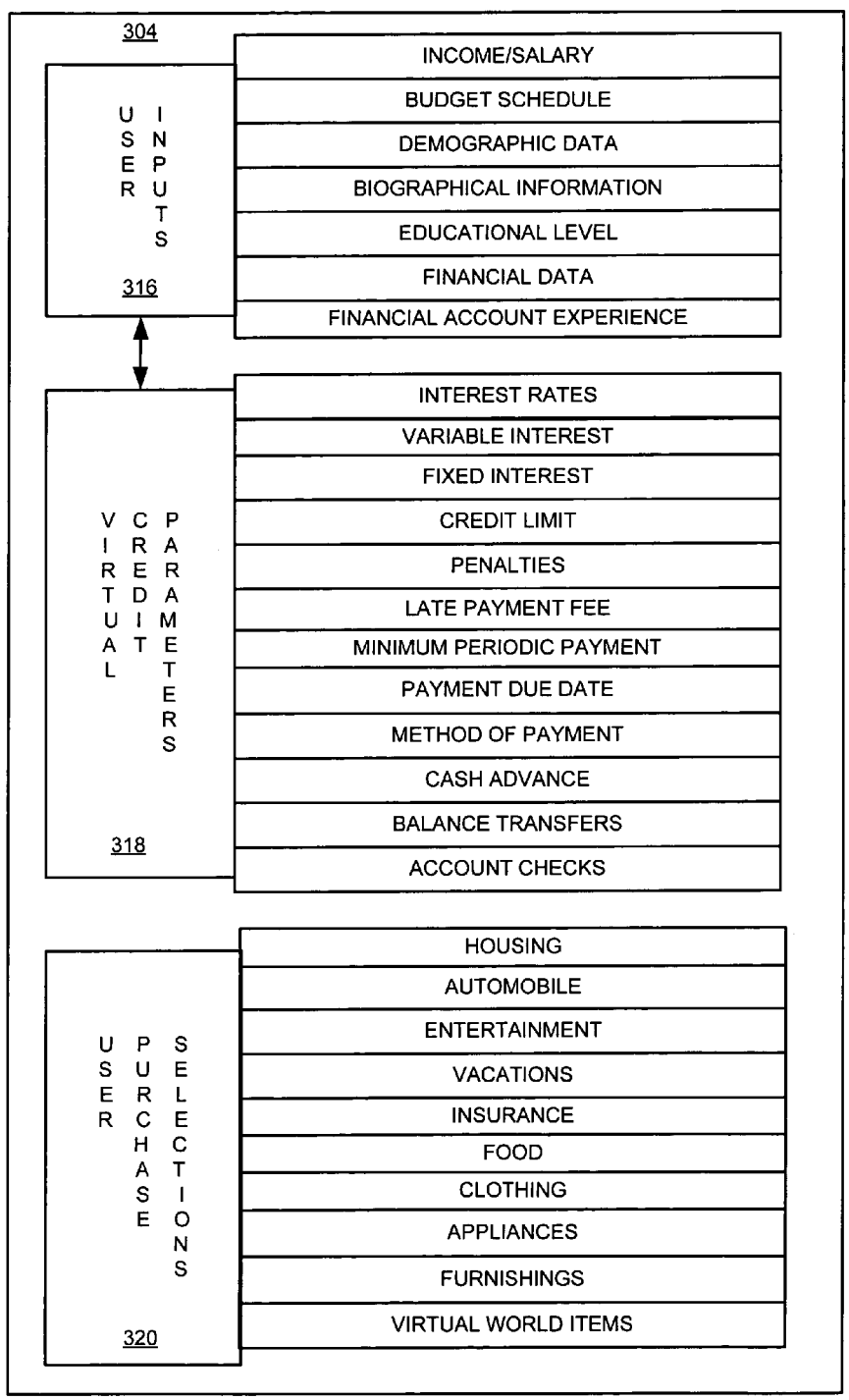
FIG. 7 is a schematic block diagram showing exemplary categories of informational data that may be involved in some embodiments.

The schematic block diagram of FIG. 7 shows an illustrative but not exhaustive list of data categories that can be accessed in the memory 304 by the user interface 306 and the feedback module 308. For example, user inputs 316 may include categories such as income/salary, budget schedule, demographic data, biographical information, educational level, financial, and financial account experience. As an additional example, virtual credit parameters 318 may include categories such as interest rates, variable interest, fixed interest, credit limit, penalties, late payment fee, minimum periodic payment, payment due date, method of payment, cash advance, balance transfers, and account checks. As a further example, user purchase selections 320 may include categories such as housing, automobile, entertainment, vacations, insurance, food, clothing, appliances, furnishings, and virtual world items.

Figure 8:
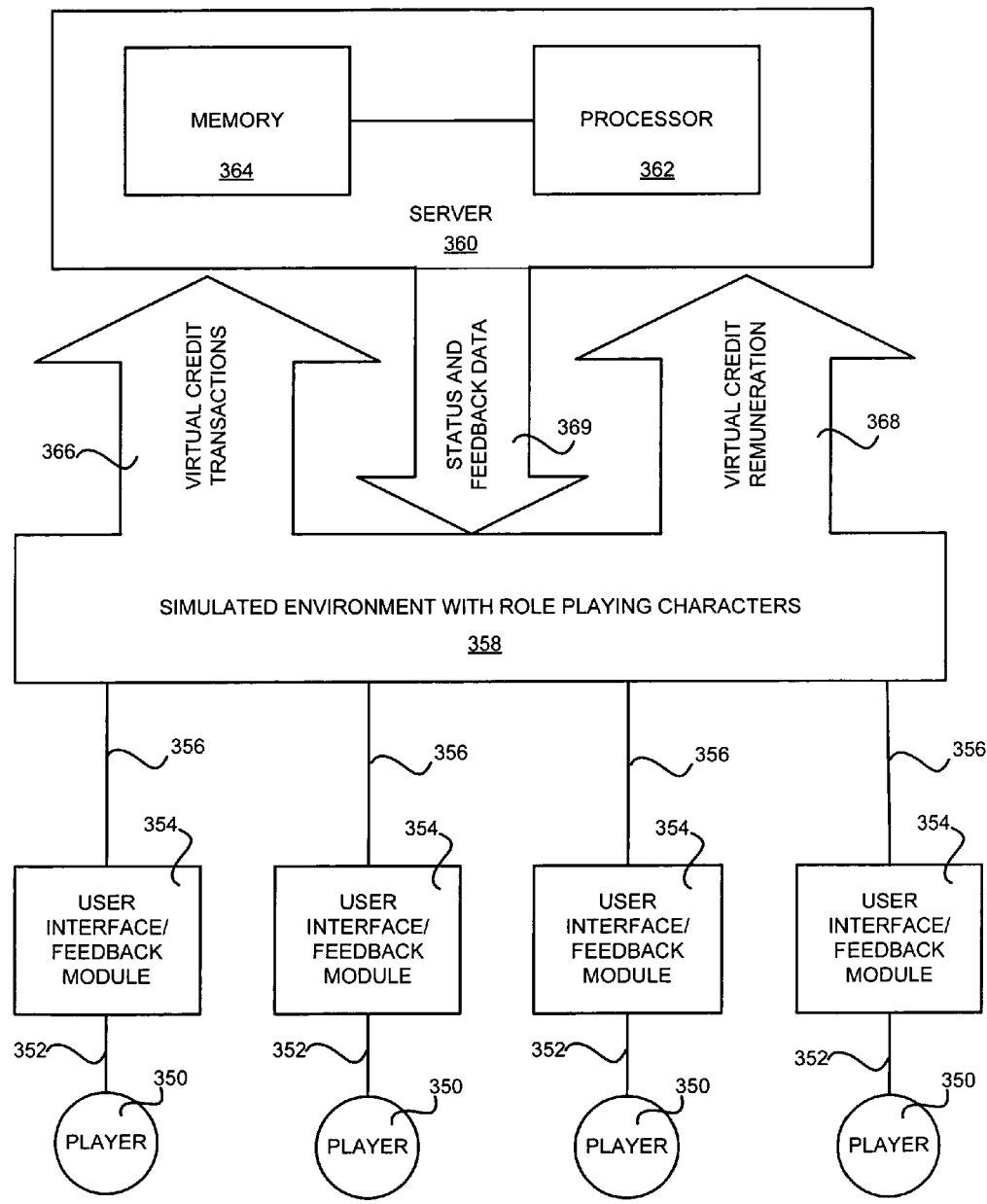
FIG. 8 is a schematic functional diagram showing a possible implementation in a simulated environment with role playing characters.

The schematic block diagram of FIG. 8 shows an exemplary embodiment for a multi-player system implemented in a simulated environment with role playing characters. Of course, other types of simulated environments have the capability for practicing the disclosed methods and techniques, particularly where multiple players interact with the simulated environment over extended periods of time. In many instances the players can logon for a period of participation, and from time to time logoff in order to carry out their real-world activities and obligations, sometimes perpetuating the fictional role playing over many weeks and months.

As shown in FIG. 8, individual players 350 have access via a first bi-directional communication link 352 to a user interface/feedback module 354 with connects through a second bi-directional communication link 356 to a simulated environment 358. Such players can interact with each other or with characters, events, purchase opportunities, competitions, and the like that are provided in the simulated environment 358. The bi-directional communication links also serve to provide player access to products and/or services and/or other items of value that can be acquired pursuant to a virtual credit arrangement.

A server 360 includes a processor 362 connected with a memory 364 in order to receive, store, update, process, and transmit information data and messages regarding virtual credit arrangements related to the simulated environment 358. In that regard, various details regarding virtual credit transactions are transmitted through a third communication link 366 to the server 360. Similarly various details regarding virtual credit remuneration or compensation are transmitted through a fourth communication link 368 to the server. Another communication link 369 enables status and feedback information to be communicated back to the simulated environment 358, and in some instances back to the players 350.

Figure 9:
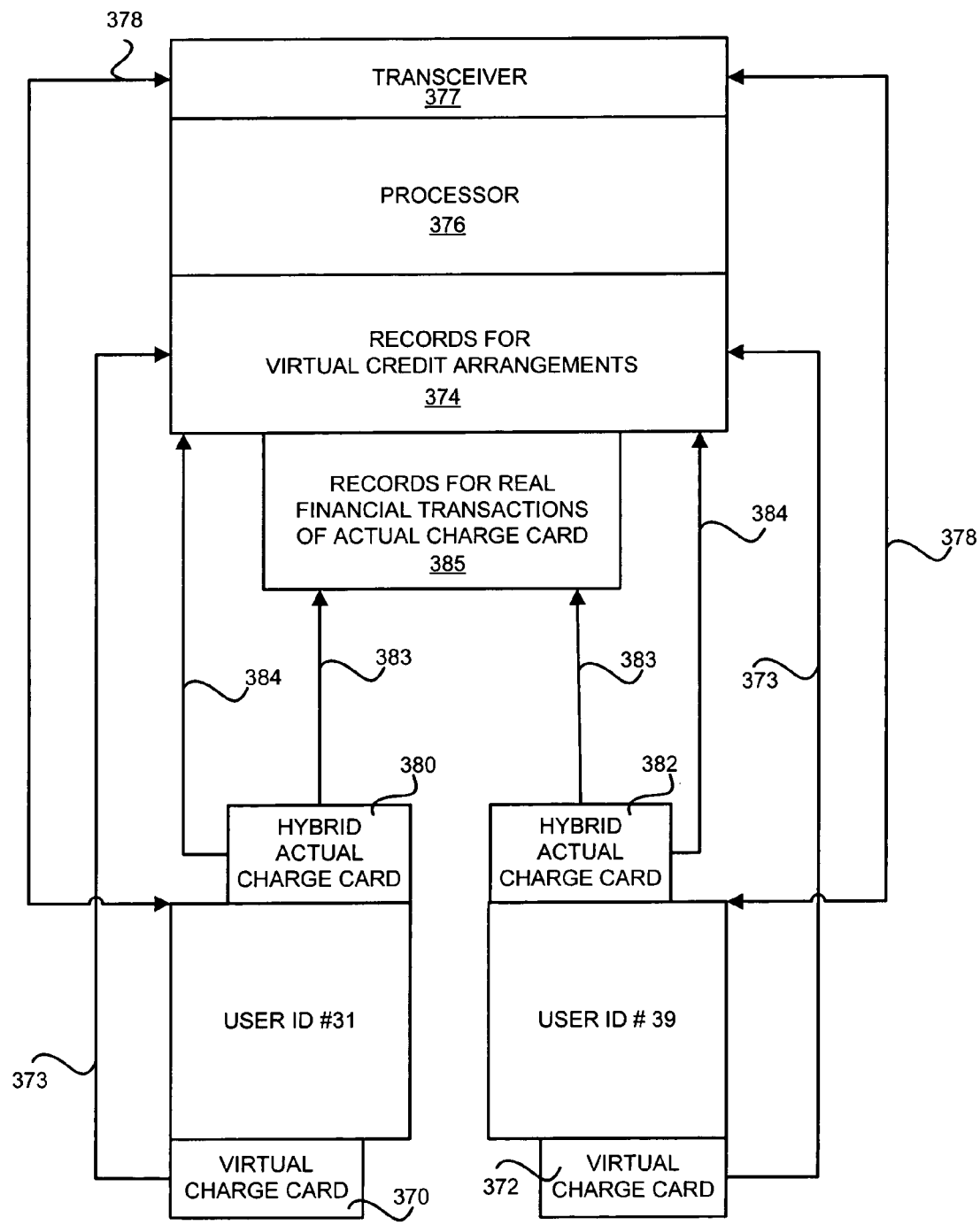
FIG. 9 is a schematic functional diagram for an exemplary system that embodies various features.

The schematic block diagram of FIG. 9 shows an exemplary embodiment wherein multiple users (e.g., user ID #31 through user ID #39) can use virtual accounts such as virtual charge cards 370, 372 in order to participate in virtual financial transactions. When the virtual charge card is used, a record of the transaction is transmitted as indicated by arrows 373 for storage in a memory device 374 that keeps records for virtual credit arrangements. A processor 376 is operatively coupled to the memory device 374 and also to a transceiver 377 for bi-directional communication regarding the virtual financial transaction through link 378 with the users #31 through #39.

These same users #31 through #39 also have access to hybrid actual charge cards 380, 382 in order to participate in actual real-world financial transactions. When the hybrid actual charge card is used, a record of the transaction is transmitted as indicated by arrows 383 for storage in a memory device 385 that keeps records for real financial transactions. Such real financial transactions may or may not be related to a virtual credit arrangement. However in some instances the hybrid actual charge card usage may be directly or indirectly related to a virtual credit arrangement, including but not limited to down payments, guarantees, compensation, renegotiation, resolution, transferability, etc. The details of such relationship will be communicated to the virtual credit arrangements storage memory device 374 as indicated by arrows 384. The bi-directional communication link 378 serves shared functional purposes for both the virtual charge card and the actual charge card, including but not limited to transmitting messages regarding credit terms associated with each different user ID account as well as feedback and status information for purchases, payments, negotiations, remuneration, and resolution involving the virtual credit arrangements.

It will be understood that the processor 376 and bi-directional link 378 are also operatively coupled with the memory device 385 in order to provide bi-directional communication regarding hybrid charge card transactions through link 378 with the users #31 through #39. Such communications may include the results or consequences of purchases and/or payments made regarding the actual charge card transactions. Such communications may also relate to terms of a credit transaction.

It will be further understood that all of the references herein to communication links with virtual account users and real-world account users may include interactive communications involving question/answer sequences, prompt/selection sequences, option/choice sequences, and the like.

It will also be understood by those skilled in the art that the various communication links can be separated into different communication channels or media as well as combined into an integrated broadband or narrowband link such as wired, wireless, cable, etc. It is further understood that integrated or separate modules can be provided for user interface functions and/or for feedback functions. The particular exemplary systems disclosed herein are provided only for illustration.

Figure 10:
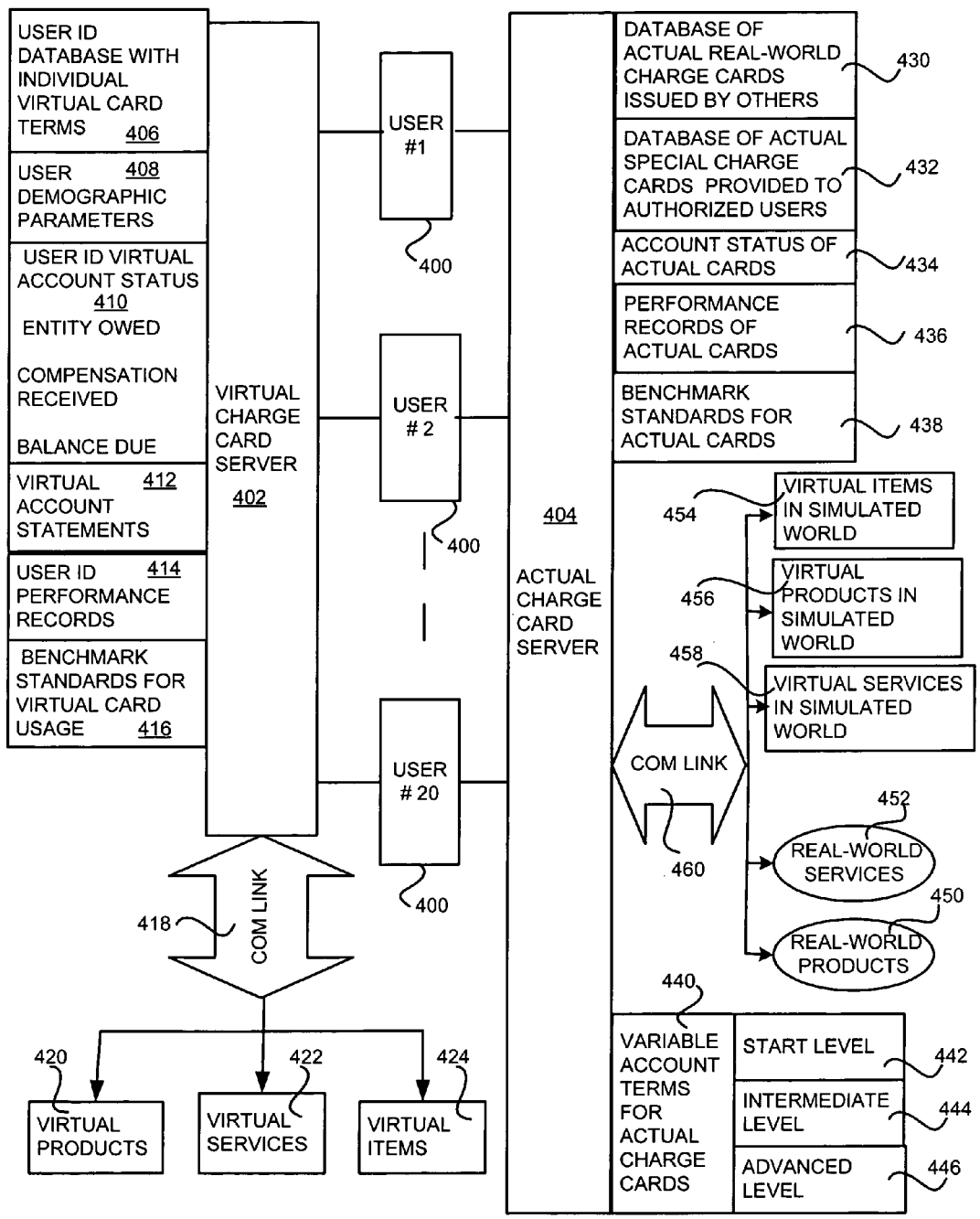
FIG. 10 is a more detailed schematic functional diagram for some embodiments that incorporate virtual charge cards and real-world charge cards.

Referring to the schematic block diagram of FIG. 10, a plurality of persons 400 (e.g., user #1, user #2 through user #20) have access to both a virtual charge card server 402 and an actual charge card server 404. The disclosed system provides for monitoring any action taken to make resolution or provide compensation that may be required by a virtual credit arrangement.

The embodiment of FIG. 10 provides a server apparatus including a memory and a processor for maintaining information regarding credit transactions involving purchases by a user of various virtual products and/or services and/or virtual items. A bi-directional user interface is provided for exchanging information messages between the user and the server apparatus regarding credit terms associated with the purchases. As described in more detail herein, the embodiment of FIG. 10 is an exemplary implementation of a system and method wherein credit transactions are capable of resolution by virtual-world compensation and by real world compensation.

The access shown for the multiple users in FIG. 10 is for purposes of illustration, and persons skilled in the art will understand that various types of communication links can be utilized to achieve the necessary functional data and message exchanges between the users and the computerized data processing and storage systems exemplified by the servers.

Also, various types of virtual credit arrangements and real-world financial accounts can be incorporated into the type of system as disclosed herein. In some instances, specific terms of a virtual credit arrangement or transaction may be based on one or more factors such as demographic information, financial account records, experience levels, completion of performance benchmarks, role play world activities, and user negotiations.

The virtual charge card server 402 includes various predetermined data records as well as other dynamically updated records that are used by the server to help provide virtual credit services based on different types of credit arrangements and accounts. Exemplary categories of records available to the virtual charge card server 402 include user ID data and related individual virtual card terms 406, user demographic parameters 408, user ID virtual account status data 410 (e.g., entity/person owed, compensation already received, and remaining balance due), virtual account statements 412, user ID performance records 414, and benchmark standards for virtual card usage 416.

A bi-directional communication link 418 enables the users 400 to have access for engaging in credit transactions involving virtual products 420, virtual services 422, and virtual items 424. When a credit transaction has been completed based on advertised or negotiated terms, the informational details are transmitted via communication link 418 to the server for appropriate processing and storage. This allows any balance due or obligation owed to be posted to the user's virtual credit account. When remuneration is made by one of the multiple users with something of real value against such balances due or obligations owed, such activity is also posted to the appropriate virtual credit account.

The actual charge card server 404 includes various predetermined data records as well as other dynamically updated records that are used by the server to help provide actual credit services based on different types of credit arrangements and accounts. Exemplary categories of records available to the actual charge card server 404 includes a database 430 of actual real-world charge cards issued to users by others such as third party issuers, a database 432 for actual special charge cards provided to authorized users, account status records 434 for actual charge cards, and performance records 436 for actual charge cards. These records help to identify actual real-world accounts selected by a user, including the actual special charge cards created for the user.

Other categories of records include benchmark standards 438 for actual charge cards, and variable account terms 440 for actual charge cards. These variable account terms 440 may be divided between exemplary levels such as start level accounts 442, intermediate level accounts 444, and advanced level accounts 446. The actual charge card server 404 may enable a user to have an option to move between different participation levels. In some instances completion of performance benchmarks may be required before allowing the user to move to a high participation level.

Many of the functional capabilities and possibilities attributable to virtual credit accounts may also be provided to actual hybrid charge card accounts. For example, the user may be enabled to vary one or more of the credit terms such as interest rate, due date, grace period, penalties, credit limit, service charge, transferability, weekly or monthly or annual fees, automatic repayment, payment of other obligations, monetary advance, re-negotiated debt, and exchange value.

Some of the actual charge cards are primarily suitable for use in purchasing real-world products 450 and real-world services 452. This may especially be true of actual charge cards issued by third parties. However, some actual financial accounts issued by third parties as well as some actual special cards such as hybrid cards described herein may also have capability to purchase or otherwise become involved in transactions related to simulated credit arrangements such as simulated purchases of virtual world items 454, virtual world products 456, and virtual world services 458. As indicated in the drawing, such virtual items, products and/or services may often be found in a simulated environment such as a role playing fictional world. A bi-directional communication link 460 enables the users to engage in the various credit transactions, and provide for transaction details to be processed by the actual charge card server 404 and stored or updated in the appropriate database.

It will be understood from the embodiments of FIGS. 9 and 10 that hybrid charge accounts can be associated with a plurality of users, respectively, for use with credit transactions involving purchases of various virtual products and/or virtual services and/or virtual items. Furthermore, an aspect of the disclosed methods and systems for hybrid charge accounts provides for their credit terms to be established or changed based at least partially on user selections, demographics, user performance, user experience, and/or benchmark parameters.

The embodiments of FIGS. 8, 9 and 10 further illustrate computer apparatus that provides virtual credit including storing and processing virtual credit transactions involving products or services or items that are available in a simulated environment. An interactive communication link with the computer apparatus enables a user to participate in the virtual credit transactions. A user interface is capable of operable connection to the interactive communication link in order for the user to transmit informational inputs and to make selections that help to provide a basis for credit terms of the virtual credit transactions.

The interactive communication link also enables the user to make remuneration of a debt or an obligation resulting from the virtual credit transactions. Such remuneration may be in the form of real-world money or fictional-world money.

Based on the foregoing descriptions and drawing disclosures of exemplary embodiments, many new and advantageous features provide benefit to the virtual credit account users, as well as benefits to the entities that provide financial account services, and benefits to entities that provide simulated role playing environments. In that regard, some embodiments enable multiple users to make remuneration with something of virtual value against balances due or obligations owed for virtual credit accounts. In some embodiments multiple users can make remuneration with something of real value as resolution of virtual debts or obligations.

Features disclosed herein also include billing simulated purchases to a virtual account that allows carry-over balances. Feedback is communicated to the user regarding results of carry-over balances such as non- payment, partial payment, and full payment of balances due. Feedback is also communicated to the user regarding consequences of related purchase and payment activity for virtual credit accounts. In some instances, the system and method provides monitoring of actions taken to make resolution or provide compensation required by a virtual credit account arrangement.

Other features include periodically changing various credit terms for a virtual credit arrangement, such as interest rates, due dates, grace periods, penalties, credit limits, service charges, transferability, weekly or monthly or annual fees, automatic repayment provisions, payment of other obligations, monetary advances, re-negotiation of the debt, and exchange value as compared to real-world or fictional money. In certain instances, the user may have the option to vary one or more of these virtual account terms.

Various types of virtual credit accounts as well as actual financial accounts can be incorporated into the disclosed methods, processes, systems and apparatus including accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business and financial institution charge cards, checking accounts, lines of credit, vouchers, and installment promissory notes accounts.

Performance benchmarks for virtual credit arrangements or accounts in accordance with certain aspects of the disclosure herein may be based on the credit record of virtual accounts; credit record of real financial accounts, test results, fictional role playing achievements, fictional role playing skills acquired, previous experience, endorsements, and group memberships in real world and role playing environments. Completion of such performance benchmarks may be required before allowing the transfer to a higher participation level, and also before facilitating transition of the user to an actual financial account. Such performance benchmarks may be based on activities of the user in a role playing environment.

It is to be understood that different categories of purchases may be available to be charged to a virtual credit account, such as travel reservations, auctions, food, clothing, merchandise, vehicles, insurance, appliances, furnishings, recreation, competitions, other items having virtual monetary value, installment purchases, entertainment, rentals, education, books, publications, games, other items having real monetary value, and fictional role playing items.

Some embodiments contemplate using a simulated billing period for virtual credit account that occurs in real time at various intervals, such as a month, a week, a day, an hour, or lesser periods. The simulated billing period may be based on various parameters such as the number of purchase transactions, average balance owed, highest balance owed, user's age, user's education, user's experience level, and user's benchmark performance.

Virtual account terms can be based on various informational data, such as demographic information, past performance records, user negotiations, and choices selected by users. The terms of usage of hybrid charge accounts capable of both virtual account activities and real-world financial transactions can be established or changed based at least partially on user selections, user demographics, as well as other factors that are also used for determining virtual credit account terms.

Although the virtual credit arrangements may primarily involve transactions involving real-world money and/or fictional world money, some embodiments clearly contemplate virtual credit arrangements and accounts that may require remuneration with a non-monetary real-world item or action, as well as remuneration with a non-monetary fictional world item or action.

In some preferred embodiments, computerized components and systems enable multiple users to make purchases or incur obligations associated with different virtual credit accounts. Also such computerized implementations enable multiple users to provide compensation against balances due or obligations owed for different virtual accounts.

The exemplary system and apparatus embodiments shown in FIGS. 6-10 along with other components, devices, know-how, skill and techniques that are known in the art have the capability of implementing and practicing the methods and processes shown in FIGS. 1-5. It is to be understood that the methods and processes can be incorporated in one or more computer program products with a carrier medium having program instructions thereon. However it is to be further understood that other systems, apparatus and technology may be used to implement and practice such methods and processes.

Figure 11:
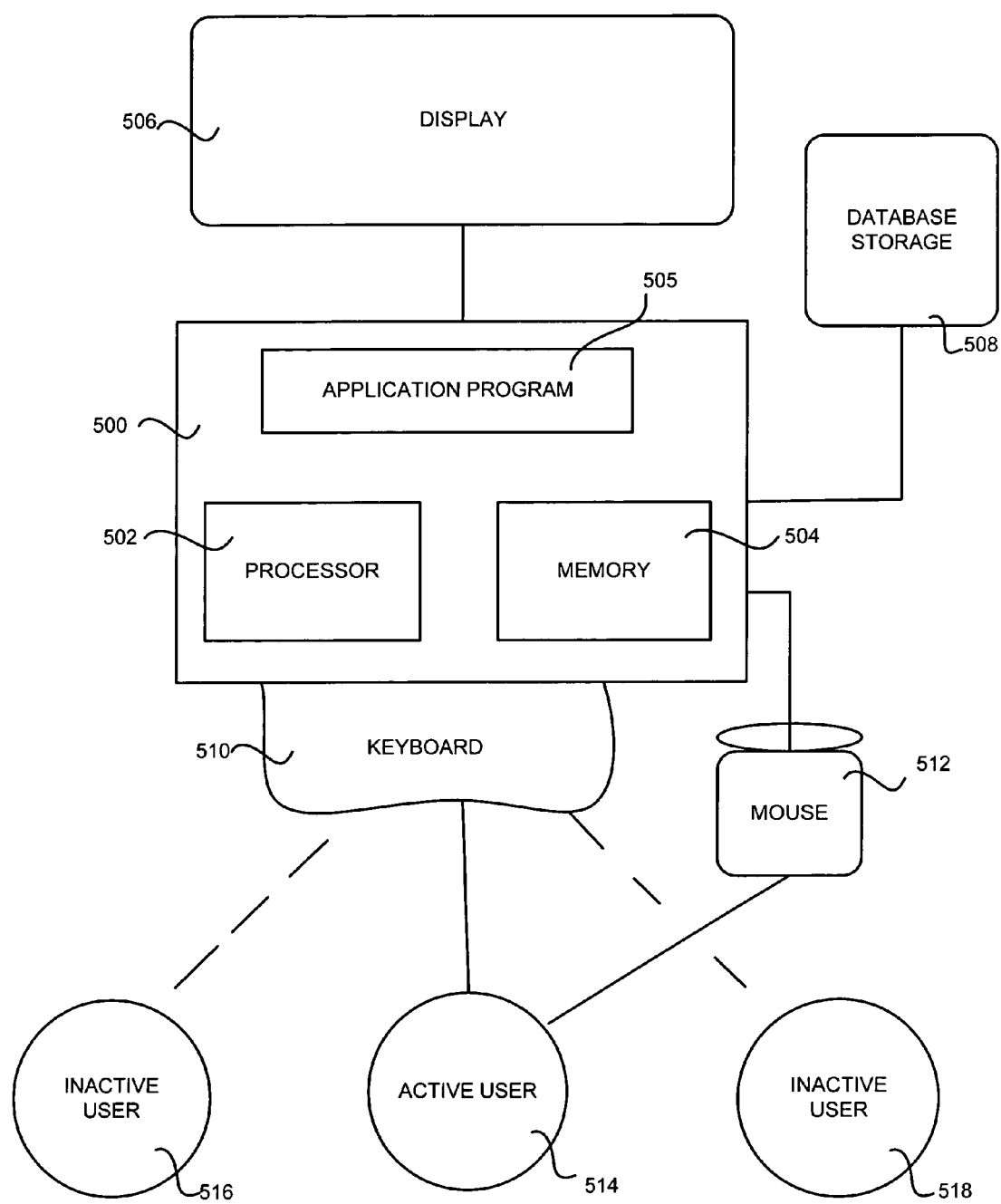
FIG. 11 is a schematic block diagram for certain embodiments implemented for one or more users sharing a computer system.

Referring to FIG. 11, a computerized implementation for the methods disclosed herein may include a computer system 500 having a processor 502 and memory 504 for running an application program 505. The application program 505 may be incorporated in one or more computer program products having a carrier medium with program instructions thereon. Peripheral components may include display 506 and database storage unit 508 as well as input devices such as keyboard 510 and mouse 512. An active user 514 may have access to features disclosed in the exemplary flowcharts of FIGS. 16-24 by running the application program 505. Inactive users 516, 518 may also periodically have access to the application program 505 including non-real time interaction through the program with each other and/or with active user 514 in order to participate in the benefits and advantages of the methods and processes disclosed herein.

Figure 12:
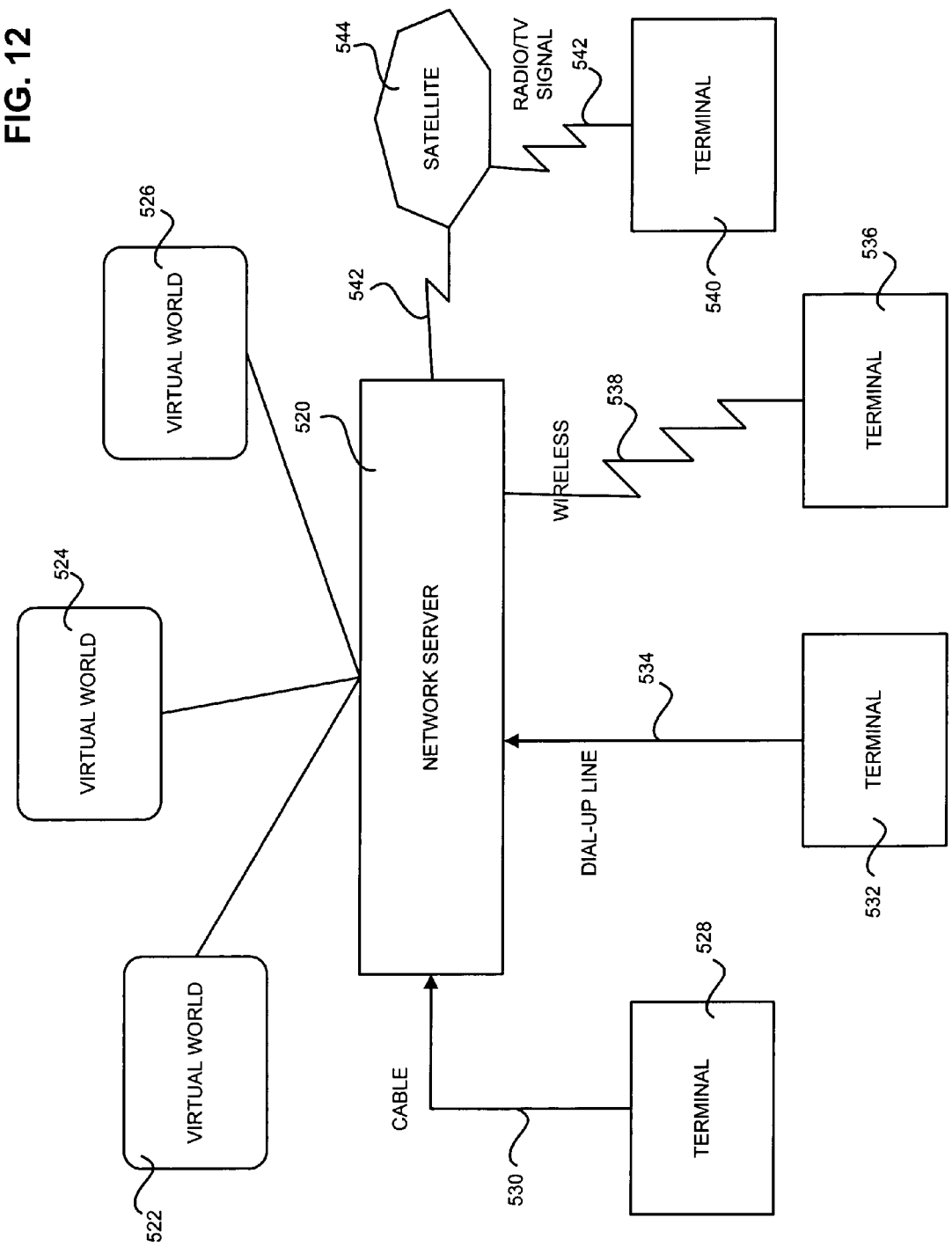
FIG. 12 is a schematic block diagram for possible implementations involving different virtual world environments accessed via exemplary types of communication links.

The schematic diagram of FIG. 12 illustrates the availability of the present methods and processes in a networking system having a network server 520 with communication links to different virtual world environments 522, 524, 526. In this exemplary version, terminal 528 has access through cable connection 530, terminal 532 has access through dial-up line 534, terminal 536 has access through wireless connection 538, and terminal 540 uses transmission signals 542 (e.g., radio or television signals) via satellite 544 for access to network server 520. As with the system of FIG. 11, players may be logged on to participate simultaneously in real-time virtual credit transactions in simulated world environments, or be respectively logged on during non-overlapping or partially overlapping time periods. Such participation may be directly with other parties or indirectly through intermediaries, depending on the circumstances involved.

Figure 13:
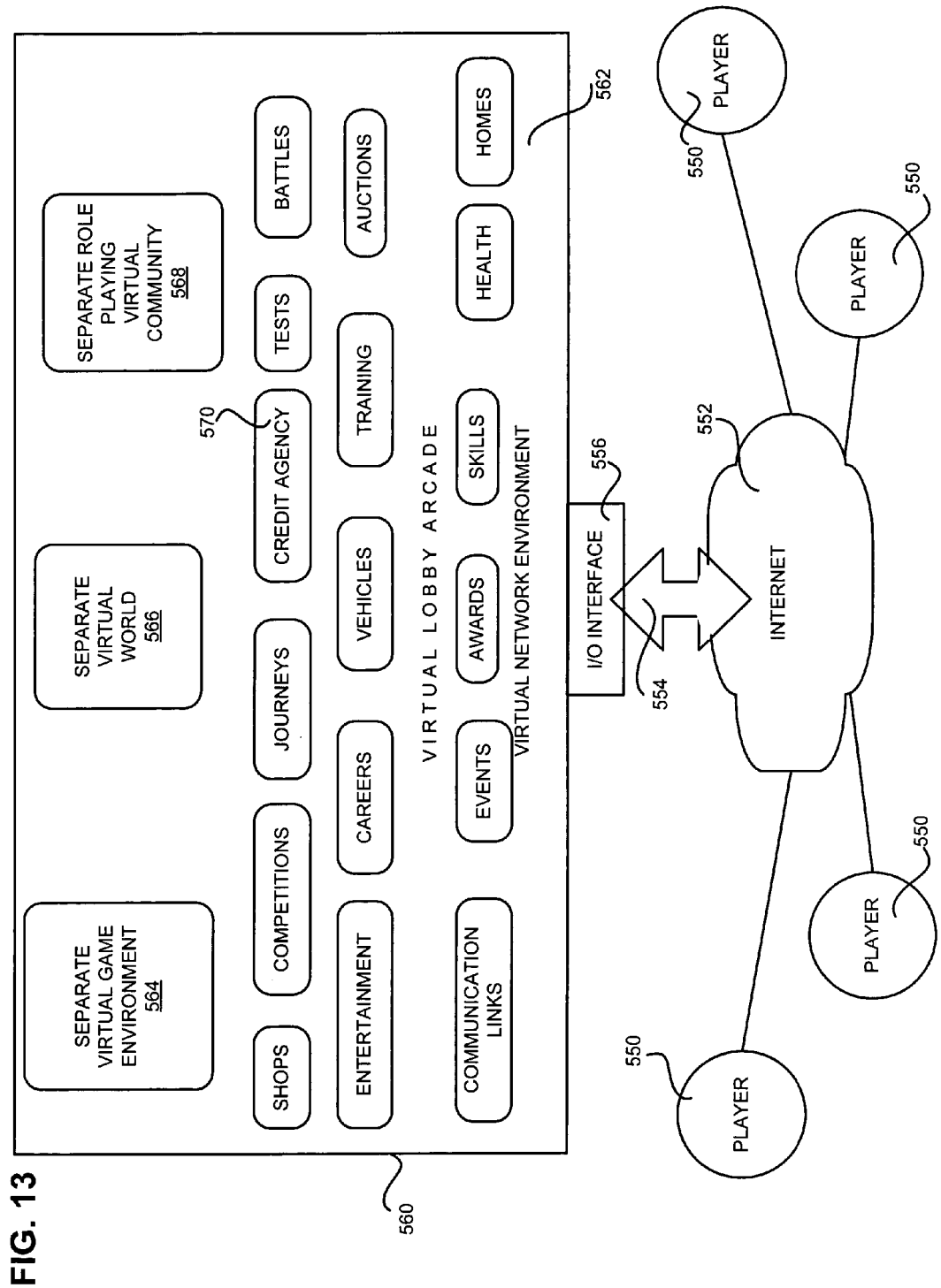
FIG. 13 is a schematic block diagram showing an embodiment providing player access via the Internet to a virtual network of separately operated virtual world environments.

Referring to the schematic diagram of FIG. 13, access to virtual network environment 560 may be accomplished for players 550 via Internet 552 having an interactive communication link 554 through I/O interface 556. Such a virtual network 560 may include a virtual lobby arcade 562 with various types of virtual opportunities. The categories for such virtual opportunities are almost unlimited, and may for example include shops, competitions, journeys, test, battles, entertainment, careers, vehicles, training, auctions, communication links, events, awards, skills, health and homes. A virtual credit agency office 570 operating, for example, as a storefront business may enable players to obtain information and issuance of virtual credit accounts usable in the virtual lobby arcade 562.

It will be understood that separately owned virtual environments may be included as part of the virtual network environment 560, including virtual game environment 564, virtual world 566, and role playing virtual community 568. The credit services of virtual credit agency office 570 may also be usable in these separate individual virtual environments based on appropriate agreements with their owners and/or operators.

Figure 14:
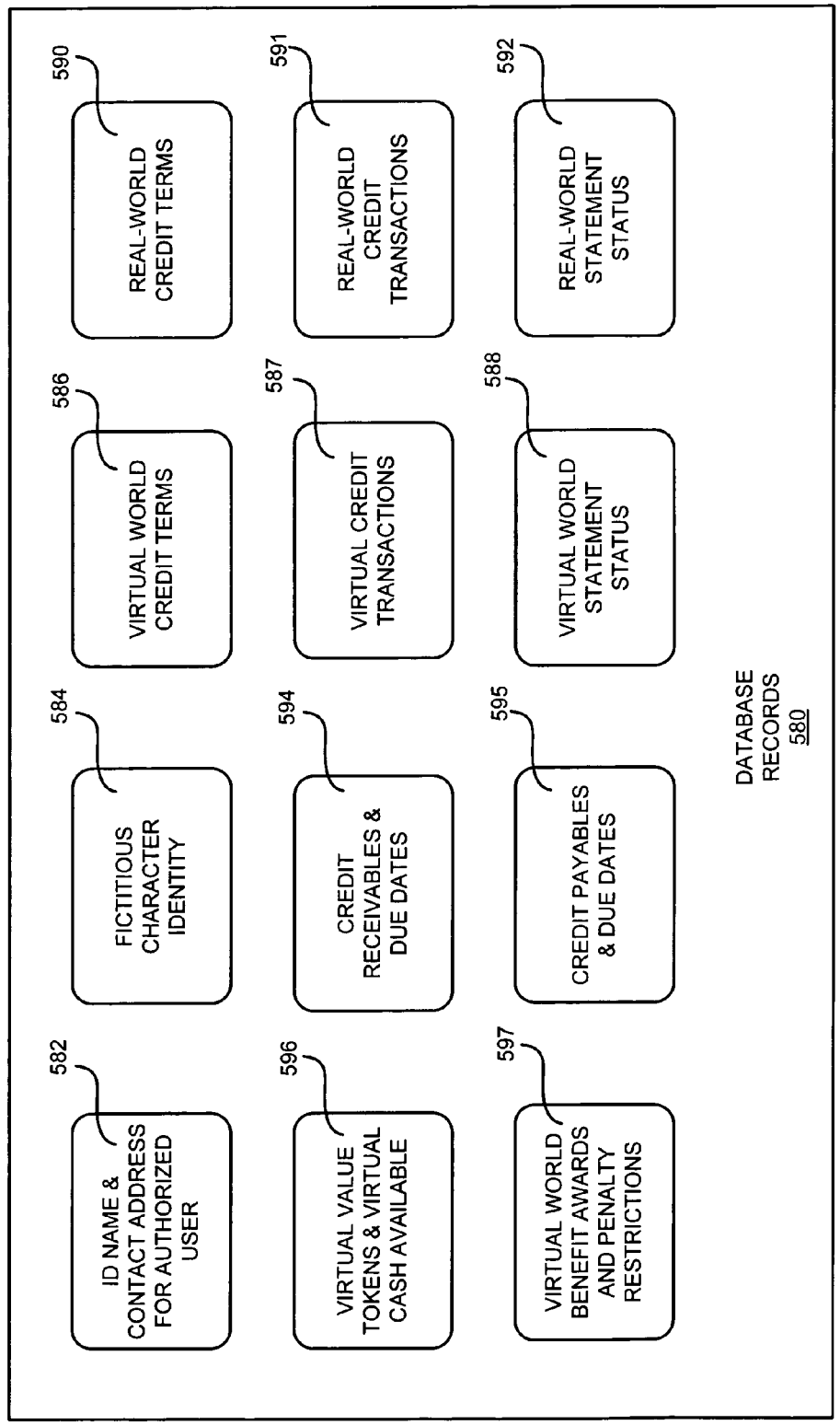
FIG. 14 shows exemplary types of database records related to real-world and virtual world credit transactions.

The schematic illustration of FIG. 14 shows exemplary database records 580 that may be used to practice the business and credit techniques disclosed herein. Various exemplary categories of records may include an ID name and contact address 582 for an authorized user, a fictitious character identity 584 for such user, virtual world credit terms 586 for a particular credit account, virtual credit transactions 587, and virtual world statement status 588. Where the credit account includes the optional features for real-world credit transactions, other exemplary categories of records may include real-world credit terms 590 for a particular credit account, real-world credit transactions 591, and real-world statement status 592.

Further exemplary categories of database records may include credit receivables and related due dates 594, credit payables and related due dates 595, virtual value tokens and virtual case available 596 for a particular player's account, and virtual world benefit awards and penalty restrictions 597 applicable to a particular player's account. It will be understood by those skilled in the art that these types of records are dynamically updated based on activity in the real-world as well as in virtual world environment. Such records are accessible as appropriate to players, credit account entities, third party business owners, virtual world environment operators and owners, and the like.

Figure 15A:
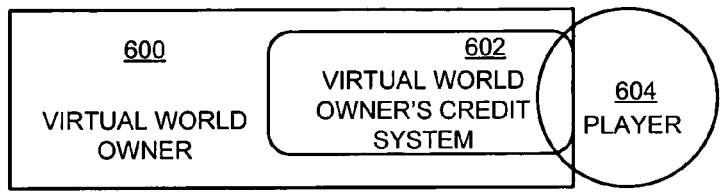
FIGS. 15A through 15E schematically illustrate some exemplary implementations of virtual credit arrangements in a simulated environment.

Various exemplary inter-relationships arising from the virtual credit transactions contemplated by the present methods and processes are illustrated in the schematic diagrams of FIGS. 15A-15E. For example, FIG. 15A depicts a virtual world publisher 600 operating a virtual world credit system 602 that extends credit to a player 604 based on the player's purchases and credit arrangements involving that particular virtual world.

Figure 15B:
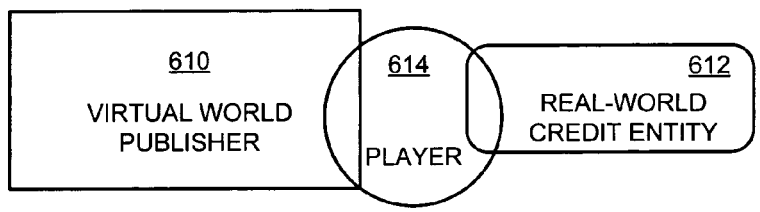

FIG. 15B shows an exemplary implementation wherein a virtual world publisher 610 engages another credit entity such as, for example, a real-world credit entity 612 for the purpose of offering virtual credit services to a player 614 who participates in that particular virtual world.

Figure 15C:
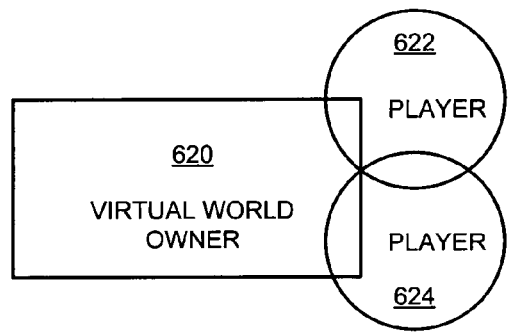

FIG. 15C shows an exemplary implementation wherein a virtual world publisher 620 enables multiple players such as 622, 624 to enter into virtual credit arrangements with each other.

Figure 15D:
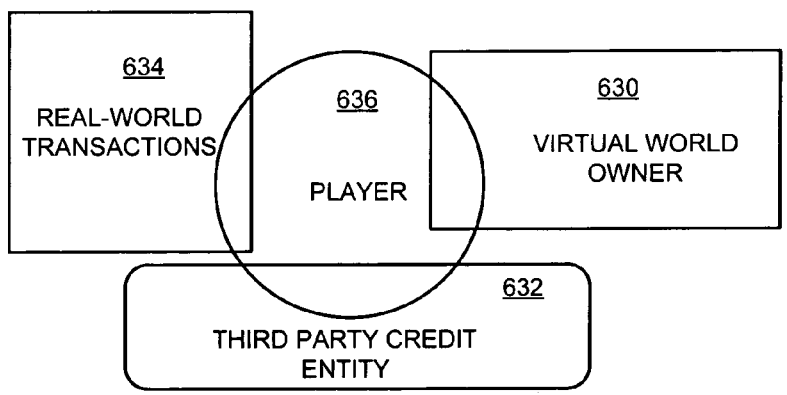

FIG. 15D shows an exemplary implementation wherein a virtual world owner 630 enables another credit entity 632 to offer either or both types of credit services: virtual world credit services to a virtual world participant or player 636, and real-world credit services involving real-world transactions 634.

Figure 15E:
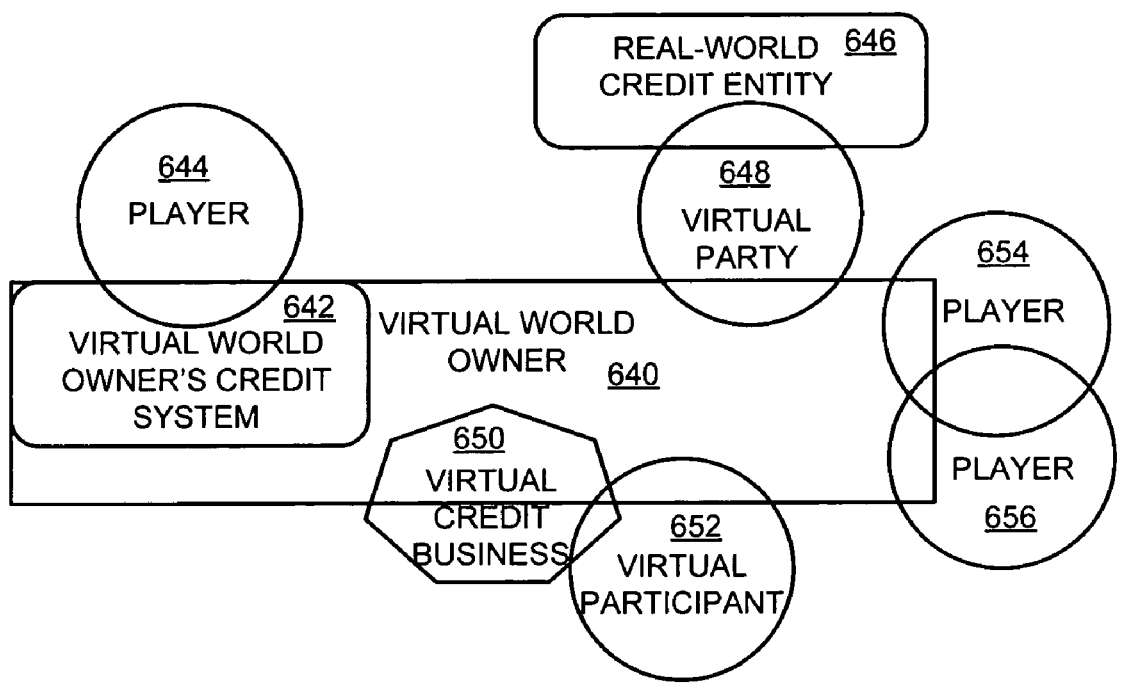

FIG. 15E shows an exemplary implementation wherein an entity or person owning virtual world rights 640 has its own virtual world credit system 642 that may involve one or more virtual participants such as player 644. A separate virtual credit business 650 operated by an authorized third party may offer its own credit account or arrangement to one or more virtual participants 652. A real-world credit entity 646 may provide virtual credit services to one or more virtual parties 648. As a final example occurring in this illustrated version of a virtual world embodiment, players 654, 656 may be enabled and allowed to arrange virtual credit transactions with each other.

It will be understood from the description and drawings herein that various embodiments of computer hardware and/or computer program products provide an opportunity for a selected credit entity to offer various types of virtual world credit services, including but not limited to virtual credit transactions between virtual world participants, virtual credit transactions between an owner or operator of the virtual world environment and one or more virtual world players, and virtual credit transactions between a third party virtual business entity and one or more virtual world players.

It will be further understood that different implementations in computer hardware and/or computer program products as disclosed herein enable a credit entity to use various forms of virtual world credit publicity and advertising including but not limited to sponsoring an event and/or an activity and/or a location in the virtual world, providing audio and/or visual and/or graphic and/or textual publicity in the virtual world, programming an activity or event in the virtual world that automatically comes to the attention of one or more virtual world players, and assuming a character role in the virtual world.

The exemplary embodiments of computer hardware and/or computer program products also enable a virtual credit card object that is issued by a credit entity to be capable of manipulation by a player in the virtual world. Such a credit entity may also have a capability of operating a real-world credit business. Such a credit entity may be controlled and/or operated by a party that also controls and/or operates the virtual world. Such a credit entity may also be involved with a credit transaction with one or more non-player third party entities in the virtual world. Such a credit entity may also be involved in a credit transaction with an owner or operator of the virtual world.

Some exemplary system embodiments disclosed herein include a processor linked to a database record and to an output device for providing a billing statement indicating payment obligations of the virtual credit account valuated in one or more of the following: fictional world money, real-world money, and non-monetary fictional world value tokens.

Some system implementations further provide a processor linked to a database record and to an output device for providing a billing statement indicating payment obligations of the virtual credit account based on one or more of the following: interest, penalties, due date, purchase activity price, real-world credit performance record, and fictional world credit performance record.

Some system embodiments may include a fictional world environment that allows purchase activity involving one or more of the following: fictional world owner, fictional world operator, third party virtual business entity, real-world credit entity, fictional world credit entity, fictional world player, fictional world participant, and fictional world character.

Figure 16:
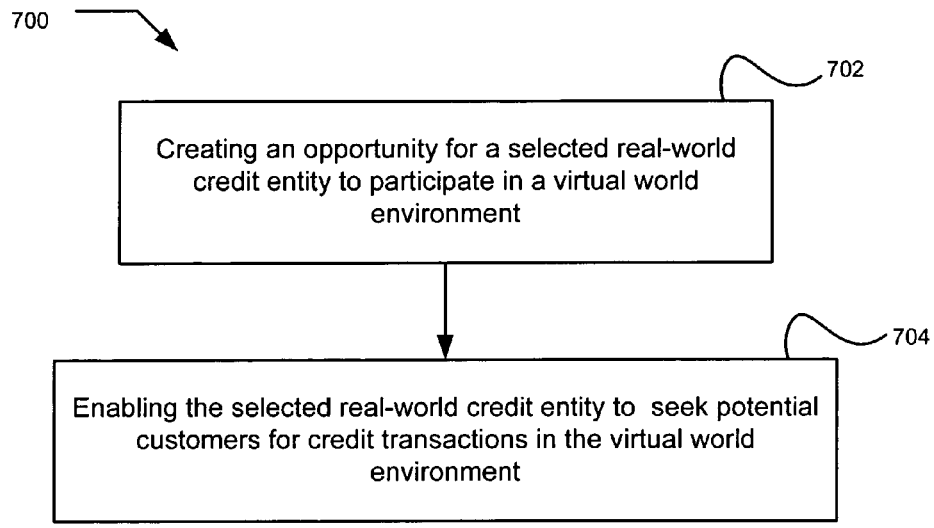
FIGS. 16 through 24 are flow charts illustrating different exemplary processes for implementing various embodiments of financial ventures involving virtual credit arrangements as disclosed herein.

Referring to the high level exemplary flow chart of FIG. 16, an exemplary process 700 creates an opportunity for a selected real-world credit entity to participate in a virtual world environment (block 702). A selected real-world credit entity is enabled to seek potential customers for credit transactions in the virtual world environment (block 704).

Figure 17:
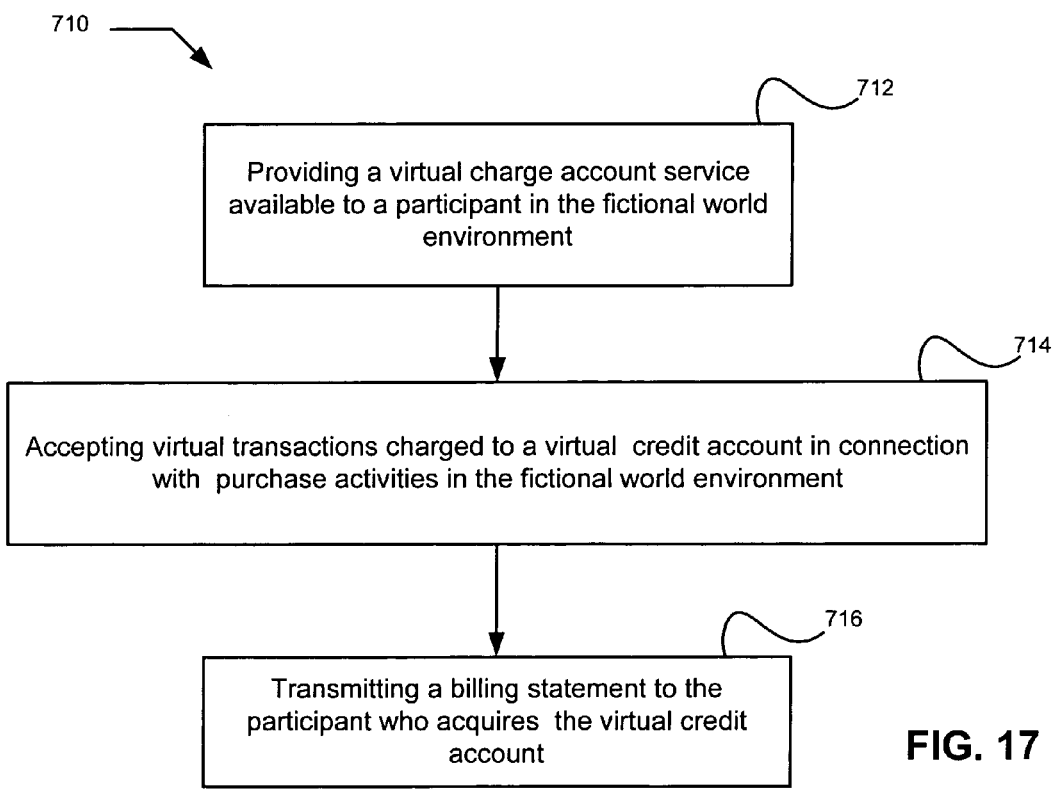

Another high level exemplary flow chart of FIG. 17 discloses a process 710 for providing a virtual charge account service available to a participant in the fictional world environment (block 712). In this implementation, the process accepts virtual transaction to be charged to a virtual credit account in connection with purchase activities in the fictional world environment (block 714). A billing statement is transmitted to the participant who acquired the virtual credit account (block 716).

Figure 18:
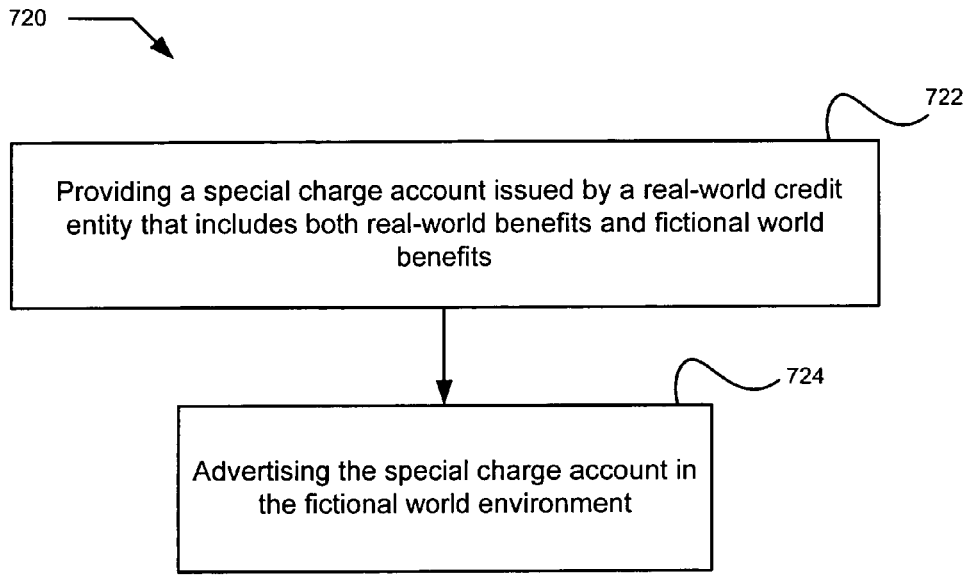

An additional process implementation 720 in the high level exemplary flow chart of FIG. 18 provides a special charge account issued by a real-world credit entity that includes both real world benefits and fictional world benefits (block 722). The process further provides for advertising the special charge account in the fictional world environment (block 724).

Figure 19:
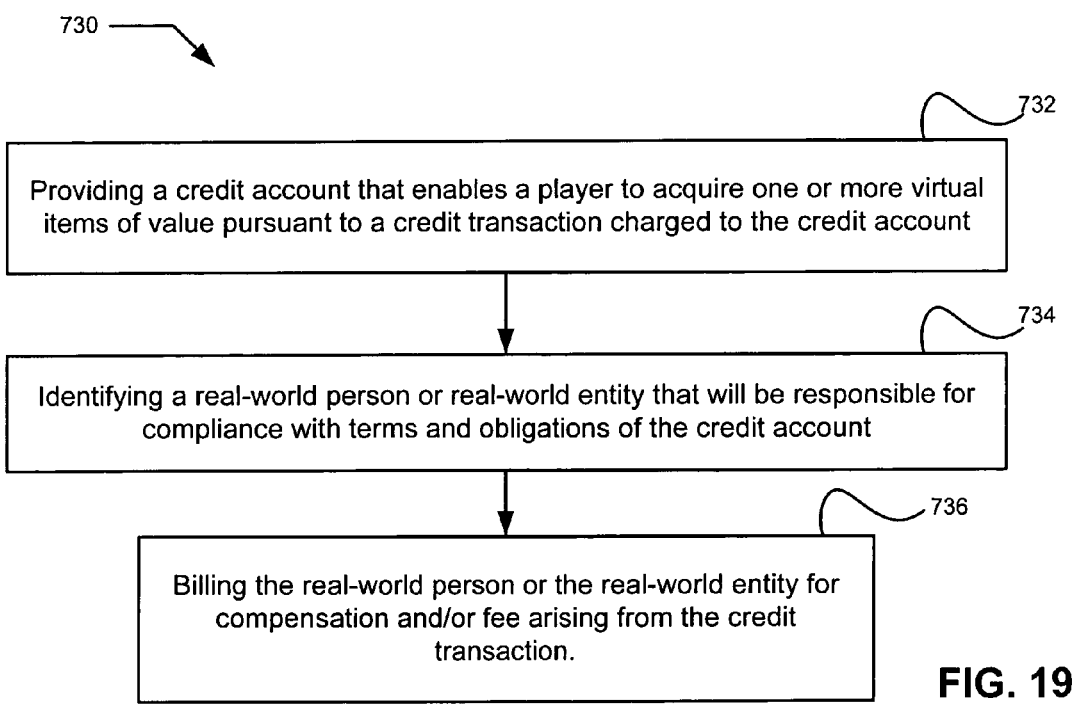

Yet another aspect of certain embodiments is disclosed in a high level exemplary process 730 of FIG. 19 that provides a credit account enabling a player to acquire one or more virtual items of value pursuant to a credit transaction charged to the credit account (block 732). A real-world person or real-world entity is identified that will be responsible for compliance with terms and obligations of the credit account (block 734). The process implements a billing to such responsible real-world person or real-world entity for compensation and/or fee arising from the credit transaction (block 736).

Figure 20:
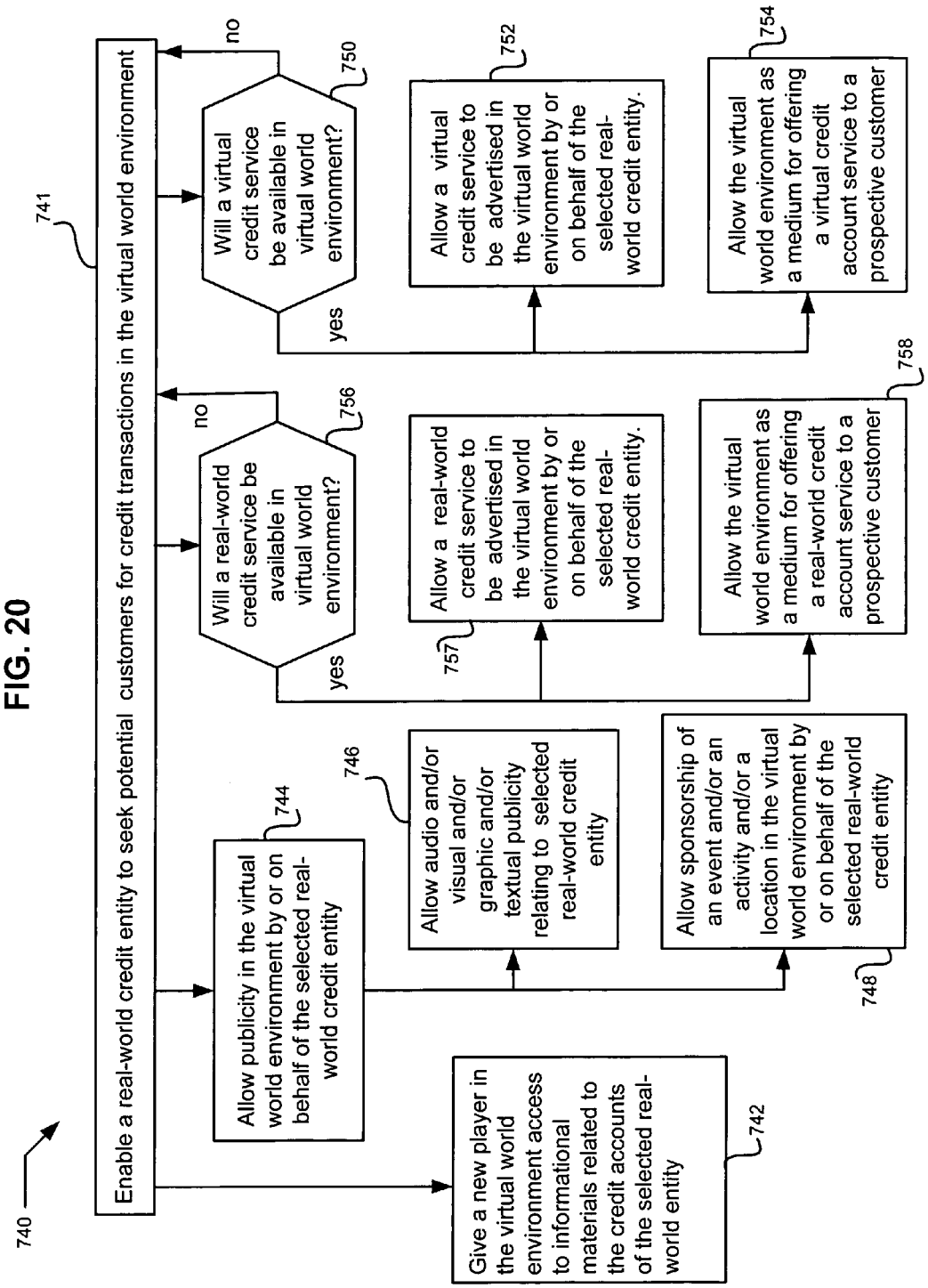

The exemplary flow chart of FIG. 20 illustrates a more detailed process 740 that enables a real-world credit entity to seek potential customers for credit transactions in the virtual world environment (block 741). One exemplary feature provides for giving a new player in the virtual world environment access to informational materials related to the credit accounts of the selected real-world entity (block 742).

Publicity is allowed in the virtual world environment by or on behalf of the selected real-world entity (block 744). Such publicity may include allowing audio and/or visual and/or graphic and/or textual publicity relating to the selected real-world entity (block 746). Other exemplary publicity may include allowing sponsorship of an event and/or an activity and/or a location in the virtual world environment by or on behalf of the selected real-world credit entity (block 748).

At some point in time a decision is made whether or not a virtual credit service will be made available in the virtual world environment (decision block 750). If not, then additional efforts seeking potential customers (block 741) may take place. If so, then the virtual credit service may be allowed to be advertised in the virtual world environment by or on behalf of the selected real-world credit entity (block 752). Also the virtual world environment may serve as a medium for actually offering the virtual credit account service to a prospective customer (block 754).

A decision is also made whether or not a real-world credit service will be made available in the virtual world environment (decision block 756). If not, then additional efforts seeking potential customers (block 741) may take place. If so, then the real-world credit service may be allowed to be advertised in the virtual world environment by or on behalf of the selected real-world credit entity (block 757). Also the virtual world environment may serve as a medium for actually offering the real-world credit account service to a prospective customer (block 758).

Figure 21:
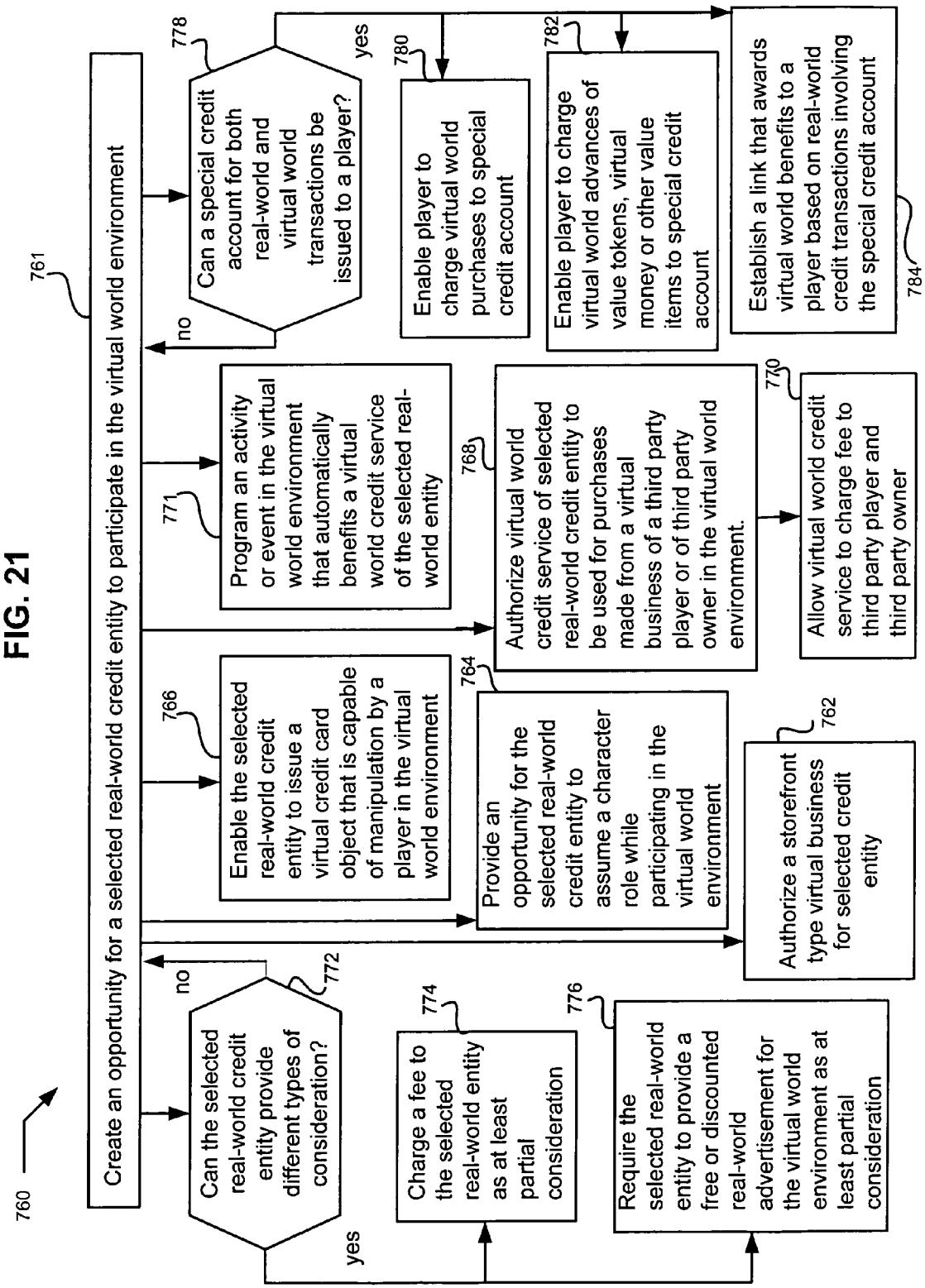

The exemplary flow chart of FIG. 21 illustrates a more detailed process 760 that creates an opportunity for a selected real-world credit entity to participate in the virtual world environment (block 761). Such an opportunity may include providing authorization for the selected credit entity to have a storefront type virtual business (block 762). Other possible opportunities for participation include the selected real-world credit entity assuming a character role while participating in the virtual world environment (block 764). Also the selected real-world credit entity may be enabled to issued a virtual credit card object that is capable of manipulation by a player in the virtual world environment (block 766).

Other types of participation may include authorizing a virtual world credit service of the selected real-world credit entity to be involved with purchases made from a virtual business of a third party player or third party owner in the virtual world environment (block 768). In some instances the virtual world credit service is allowed to charge a fee to the third party player and to the third party owner (block 770). A further type of participation may include programming an activity or event in the virtual world environment that automatically benefits a virtual world credit service of the selected real-world entity (block 771).

The participation of the selected real-world credit entity in the virtual world environment will probably require a decision about the different types of consideration to be provided by the selected real-world credit entity (decision block 772). If consideration is not considered to be necessary, then other types of participation can nevertheless proceed. When some consideration is deemed appropriate, it may be at least partially provided by charging a fee to the selected real-world credit entity (block 774). At least partial consideration may also be provided by requiring the selected real-world entity to provide a free or discounted real-world advertisement for the virtual world environment (block 776).

A choice may also involve whether a special credit account for both real-world transactions and virtual world transactions can be issued to a player (decision block 778). If the decision is negative or to be delayed, the other types of participation can still proceed. If the decision is affirmative, then various interactions involving are possible with the special credit account including but not limited to: enabling a player to charge virtual world purchases to the special credit account (block 780); and enabling a player to charge virtual world benefits received in advance such as value tokens, virtual money, or other value items to the special credit account (block 782); and establishing a link that awards virtual world benefits to a player based on real-world credit transactions involving the special credit account (block 784).

Figure 22:
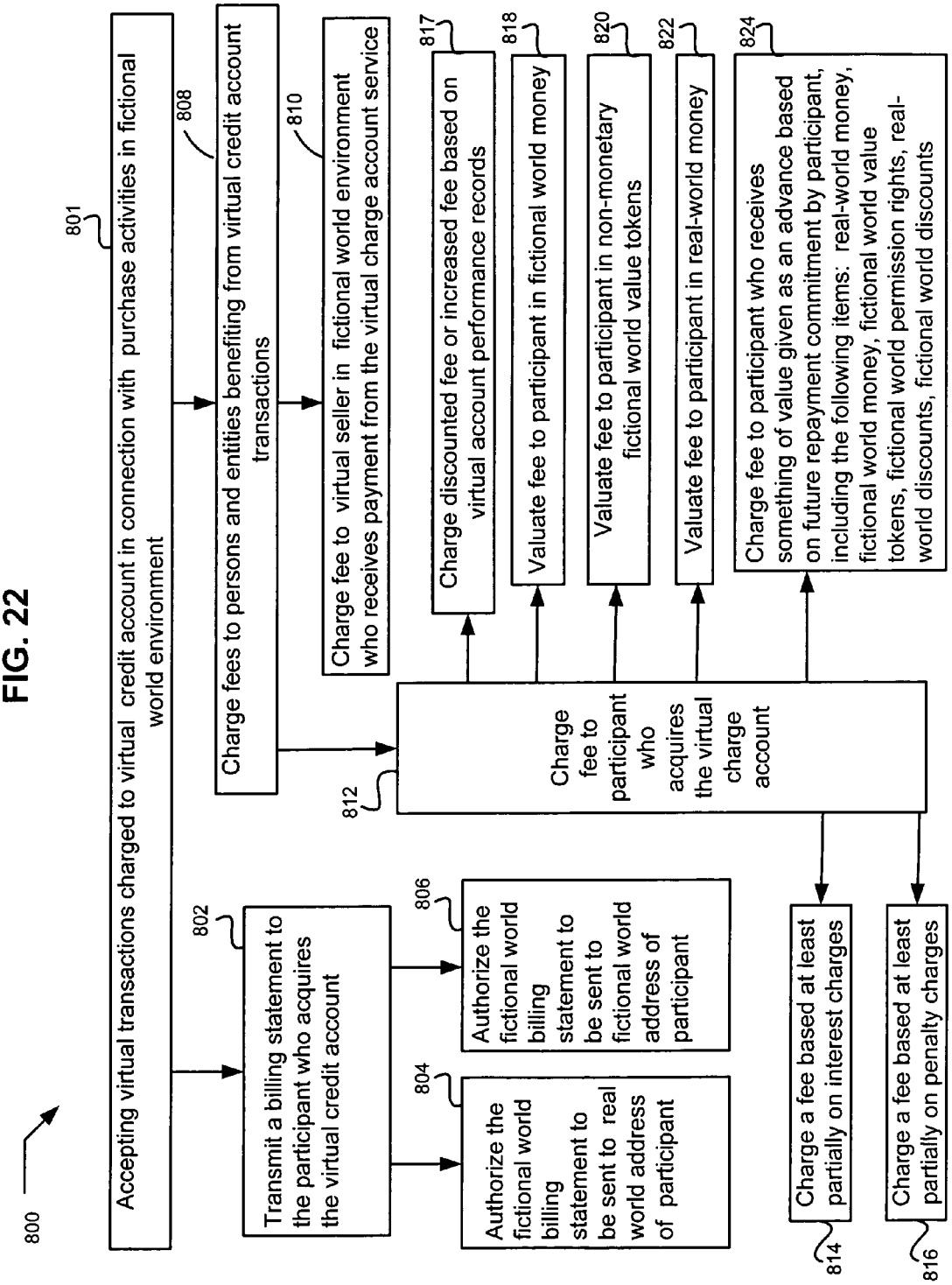

The exemplary flow chart of FIG. 22 discloses an implementation of the presently disclosed method 800 for accepting virtual transactions charged to a virtual credit account in connection with purchase activities in a fictional world environment (block 801). When such charges occur, a billing statement is transmitted to the participant who acquires the virtual credit account (block 802). Such fictional world billing statement may be authorized to be sent to a real world address of the participant account holder (block 804) or to a fictional world address of the participant account holder (block 806).

Revenue may be provided by charging fees to persons and entities benefiting from the virtual credit account transactions (block 808). Such fees may include but not be limited to the following: a fee charged to a virtual seller in the fictional world environment who receives payment from the virtual charge account services (block 810); and different types of fees charged to a participant who acquires the virtual credit account (block 812) as part of the virtual charge account service (block 812).

Examples shown for fees charged to a participant account holder may include a discounted fee or alternatively an increased fee based on the performance records for the virtual credit account (block 817). The various fees charged to a participant who owns or is responsible for the virtual credit account may be valuated in fictional world money (block 818), non-monetary fictional world value tokens (block 820), and real world money (block 822).

Another category of transactions involving the virtual credit account that may generate fees from a virtual world participant relates to advance benefits (i.e., something of value) given to the participant based on a future repayment commitment. Examples of such advance benefits funded by the virtual credit account include real-world money, fictional world money, fictional world value tokens, fictional world permission rights, real-world discounts, and fictional world discounts (block 824).

Figure 23:
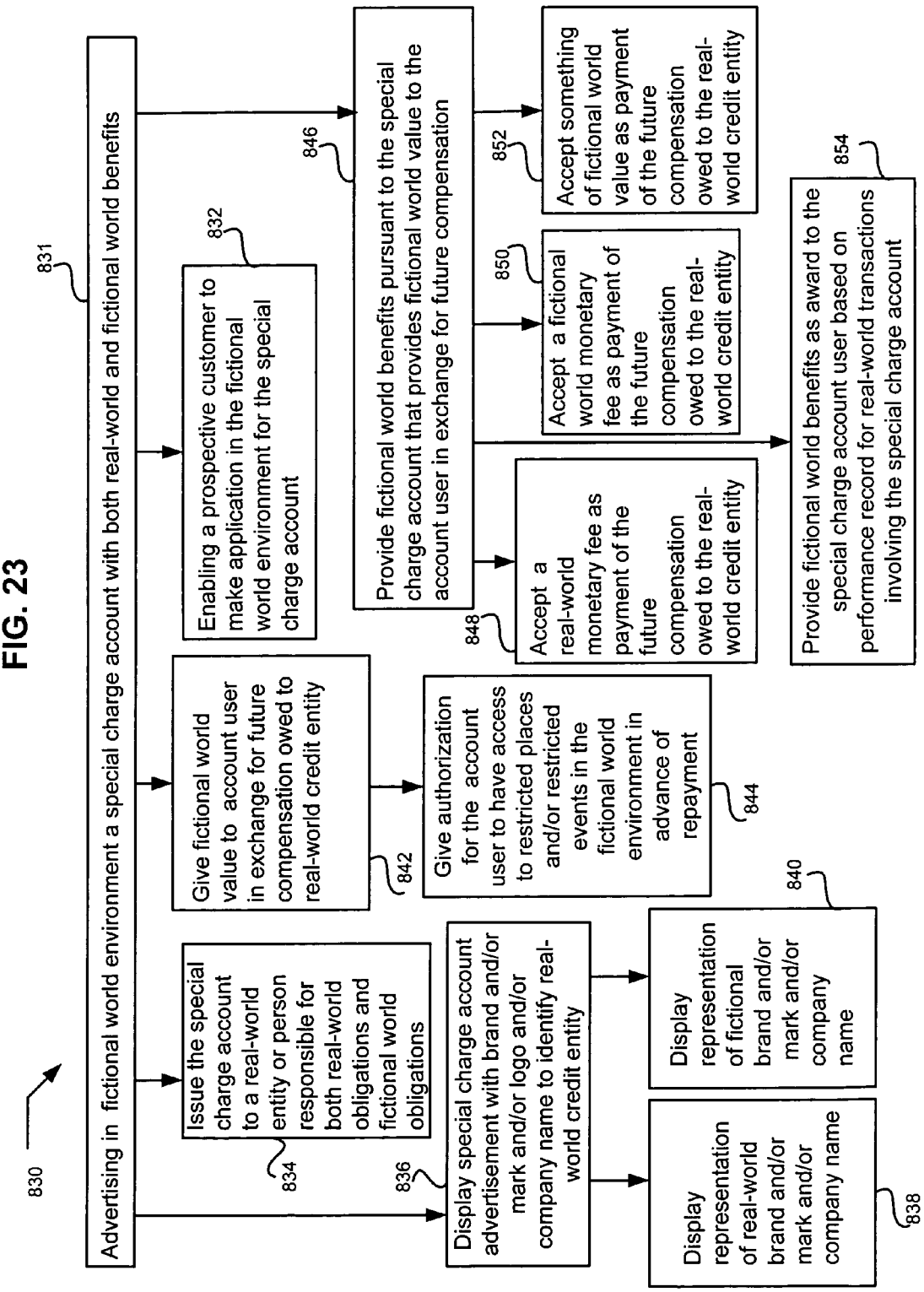
Figure 24:
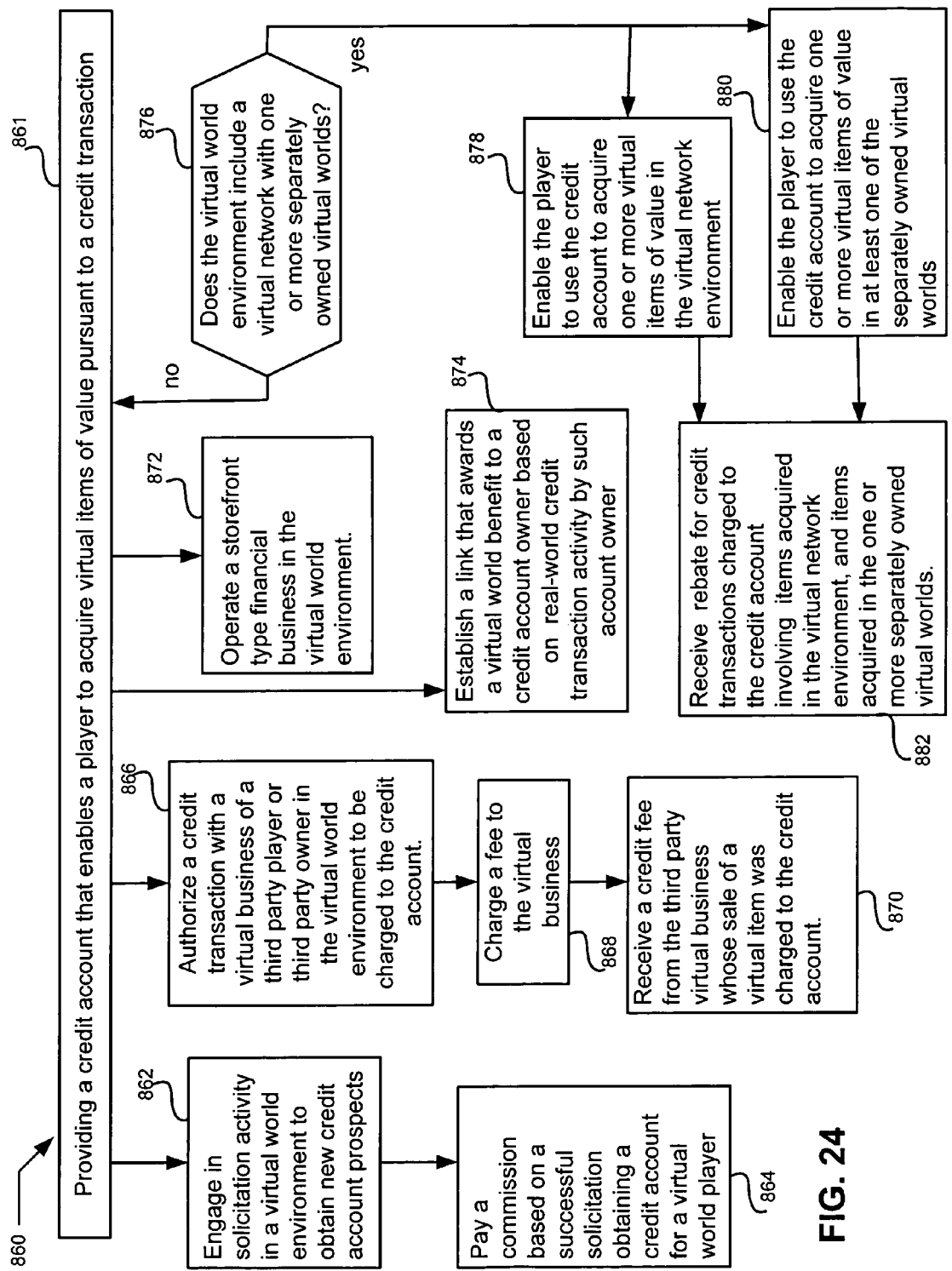

A further more detailed aspect of the method disclosed herein is shown in the process 830 of the exemplary flow chart of FIG. 23. This illustrated implementation enables a prospective customer to make application in the fictional world environment for the special charge account (block 832).

The implementation of FIG. 23 also provides for advertising in a fictional world environment for a special charge account having both real-world and fictional world benefits (block 831). Such advertising may be implemented in special charge account displays of a brand and/or mark and/or logo and/or company name identifying the real-world credit entity (block 836). Such displays may feature a real-world (block 838) as well as a fictional world (block 840) brand, mark, logo, and company name of the real-world credit entity.

Other types of advertising activity may involve giving something of fictional world value to an account user in exchange for future compensation owed to the real-world credit entity (block 842). Such fictional world value items may include giving authorization for the account user to have access to restricted places and/or restricted events in the fictional world environment in advance of repayment (block 844).

Some embodiments of the disclosed method provide other types of advance fictional world benefits pursuant to the special charge account services providing fictional world value to the account user in exchange for future compensation (block 846). These advance benefits may include, for example, accepting different types of future compensation for debts owed by a virtual credit account user including the accepting payment of real-world monetary fees (block 848), fictional world monetary fees (block 850), and something of fictional world value (block 852).

Fictional world award benefits may also be provided to the virtual credit account user based on the performance record for real-world transactions involving the special charge account (block 854).

Another aspect of the presently disclosed method is illustrated in a process 860 shown in exemplary flow chart of FIG.

24 relating to providing a credit account that enables a player to acquire virtual items of value pursuant to a credit transaction (block 861). Initial activities may include engaging in solicitation activity in a virtual world environment to obtain new credit account prospects (block 862). A commission may be paid based on a successful solicitation that results in obtaining a credit account for a virtual world player (block 864).

The credit account services may include authorization of a credit transaction with a virtual business of a third party player or third party owner in the virtual world environment to be charged to the credit account (block 866). Such a credit transaction may include charging a fee to the virtual business (block 868), which may be received from the third party virtual business whose sale of a virtual item was charged to the credit account (block 870).

Other credit account activities may include operating a storefront type financial business in the virtual world environment (block 872). A link may be established that awards a virtual world benefit to a credit account owner based on real-world credit transaction activity by such account owner (block 874).

Some virtual world environments may be more complex, and an inquiry may determine whether the virtual world environment includes a virtual network with one or more separately owned virtual worlds (decision block 876). If not, then other activities may still be provided. If so, then it may be desirable to enable a player to use the credit account to acquire one or more virtual items of value in the virtual network environment (block 878). As a further possibility, it may be desirable to enable a player to use the credit account to acquire one or more items of value in at least one or perhaps more of the separately owned virtual worlds (block 880).

Other business relationships may be possible such as receiving a rebate for credit transactions charged to the credit account involving items acquired in the virtual network environment, as well as items acquired in the one or more separately owned virtual worlds (block 882).

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments shown in FIGS. 6-15E along with other components, devices, know-how, skill and techniques that are known in the art have the capability of implementing and practicing the methods and processes shown in FIGS. 1-5 and FIGS. 16-24. It is to be understood that the methods and processes can be incorporated in one or more different types of computer program products with a carrier medium having program instructions thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

One aspect of the present system and method enables a credit entity to participate in a virtual world environment with publicity and advertising in order to seek potential customers for credit transactions in the virtual world environment. In some implementations disclosed herein, a process for creating credit transactions in a fictional world environment includes making a virtual charge account service available to a participant in the fictional world environment. Virtual transactions are accepted and charged to a virtual credit account in connection with purchase activities in the fictional world environment, and a billing statement may be provided to the participant who acquires the virtual credit account.

Methods of operating a credit account business in a fictional world environment as disclosed herein may take different forms. For example, in some embodiments a special charge account may issued by a real-world credit entity that includes both real-world benefits and fictional world benefits, and advertisements for the special charge account are provided in the fictional world environment.

There are other exemplary methods and processes disclosed herein for operating a credit business in a virtual world environment. In some instances a credit account is provided that enables a player to acquire one or more virtual items of value pursuant to a credit transaction charged to the credit account. A real-world person or real-world entity may be identified that will be responsible for compliance with terms and obligations of the credit account, and be responsible for receiving a billing for compensation and/or fees arising from the credit transaction.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various features have been described in considerable detail with reference to certain preferred embodiments, other embodiments are possible. Therefore, the spirit or scope of the appended claims should not be limited to the description of the embodiments contained herein.

The invention claimed is:

1. A method of creating credit transactions in a fictional world environment, comprising:
   providing a virtual charge account to a user in the fictional world environment;
   incorporating a benchmark completion requirement based on an activity of the user in the fictional world environment as a basis for giving the user an option to transition from the virtual charge card account to an actual financial account; and
   using a microprocessor, transitioning the user to usage of the actual financial account responsive to the user completing the benchmark completion requirement.

2. The method of claim 1, wherein the providing a virtual charge card account to a user further includes:
   issuing an electronic charge card version of said virtual charge card account.

3. The method of claim 1, wherein the providing a virtual charge card account to a user further includes:
   issuing a hardcopy charge card version of said virtual charge card account.

4. The method of claim 1, wherein the providing a virtual charge card account to a user further includes:
   providing one or more participation levels for usage of the virtual charge card account.

5. The method of claim 4, wherein the providing one or more participation levels for usage of the virtual charge card account further includes:
   providing a plurality of levels of participation for usage of the virtual charge card account depending upon a desired financial goal, a desired educational goal, or a desired entertainment goal or a skill level, experience level or sophistication level of the user.

6. The method of claim 1, wherein the providing a virtual charge card account to a user further includes:
   enabling the user to make a simulated purchase of a good, a service, or an item of value charged to the virtual charge card account.

7. The method of claim 6, wherein the enabling the user to make a simulated purchase of a good, a service, or an item of value charged to the virtual charge card account further includes:
   enabling the user to make a simulated purchase of a good, a service, or an item of value charged to the virtual charge card account at a predetermined value.

8. The method of claim 7, wherein the enabling the user to make a simulated purchase of a good, a service, or an item of value charged to the virtual charge card account at a predetermined value further includes:
   posting the predetermined value to a virtual charge card account record.

9. The method of claim 1, wherein the providing a virtual charge card account to a user further includes:
   enabling the user to make a simulated purchase of a travel reservation, an auction, food, clothing, merchandise, a vehicle, insurance, an appliance, furnishing, recreation, competition, other items having virtual monetary value, installment purchase, entertainment, rental, education, a book, a publication, a game, or a fictional role playing item.

10. The method of claim 1, wherein the incorporating a benchmark completion requirement based on an activity of the user in the fictional world environment as a basis for giving the user an option to transition from the virtual charge account to an actual financial account includes:
    incorporating a benchmark completion requirement based on a credit record of a virtual account; a test result, a fictional role playing achievement, a fictional role playing skill acquired, a previous experience, an endorsement, or a group membership in a real world or a role playing environment.

11. The method of claim 1, wherein the incorporating a benchmark completion requirement based on an activity of the user in the fictional world environment as a basis for giving the user an option to transition from the virtual charge account to an actual financial account includes:
    incorporating a benchmark completion requirement based on an activity of the user in a role playing environment.

12. The method of claim 1, wherein the incorporating a benchmark completion requirement based on an activity of the user in the fictional world environment as a basis for giving the user an option to transition from the virtual charge account to an actual financial account includes:

provWidingan unrestricted option to transition from the virtual charge card account to the actual financial account.

13. The method of claim 1, wherein the incorporating a benchmark completion requirement based on an activity of the user in the fictional world environment as a basis for giving the user an option to transition from the virtual charge account to an actual financial account includes:

requesting a user ID of a virtual charge card account.

14. The method of claim 13, wherein the requesting a user ID of a virtual charge card account further includes:

determining if the user is on an updated approved list.

15. The method of claim 1, wherein the transitioning the user to usage of an actual financial account responsive to the user completing the benchmark completion requirement further includes:

transitioning the user to an actual financial account issued by a third party.

16. The method of claim 1, wherein the transitioning the user to usage of an actual financial account responsive to the user completing the benchmark completion requirement includes:

transitioning the user to an actual financial account taken from an account allowing carry-forward balance, an account requiring full payment, a debit card, an account with free benefit, an account with extra-cost benefits, an account providing discount promotions, a cash advance account, an account with beneficial links, an insurance product account, an account with a value added benefit, a business-issued charge card, a financial institution charge card, a checking account, a line of credit, a voucher, or a promissory note.

17. The method of claim 1, transitioning the user to usage of an actual financial account responsive to the user completing the benchmark completion requirement further includes:

communicating feedback to the user regarding a consequence of a real financial transaction involving said actual financial account.

18. The method of claim 1, further including:

providing feedback to the user regarding a result of a simulated purchase.

19. The method of claim 18, wherein the feedback to the user regarding a result of a simulated purchase includes:

providing periodic feedback including virtual charge card account status information to the user.

20. The method of claim 1, further including:

utilizing a simulated billing period for the virtual charge card account that occurs in real time at one or more intervals.

21. The method of claim 20, wherein the utilizing a simulated billing period for the virtual charge card account that occurs in real time at one or more intervals further includes:

utilizing a simulated billing period based on a number of purchase transactions, an average balance owed, a highest balance owed, a user age, a user education level, a user experience level, or a user benchmark performance.

\* \* \* \* \*

UNITED STATES PATENT AND TRADEMARK OFFICE
CERTIFICATE OF CORRECTION

PATENT NO. : 7,774,275 B2  
APPLICATION NO. : 11/069905  
DATED : August 10, 2010  
INVENTOR(S) : Jung et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
Twenty-second Day of March, 2011

David J. Kappos
*Director of the United States Patent and Trademark Office*